United States Patent
Tanabe

(10) Patent No.: US 11,898,980 B2
(45) Date of Patent: Feb. 13, 2024

(54) GAS SENSOR

(71) Applicant: TDK Corporation, Tokyo (JP)

(72) Inventor: Kei Tanabe, Tokyo (JP)

(73) Assignee: TDK Corporation, Tokyo (JP)

( * ) Notice: Subject to any disclaimer, the term of this patent is extended or adjusted under 35 U.S.C. 154(b) by 416 days.

(21) Appl. No.: 17/312,292

(22) PCT Filed: Sep. 24, 2019

(86) PCT No.: PCT/JP2019/037256
§ 371 (c)(1),
(2) Date: Jun. 9, 2021

(87) PCT Pub. No.: WO2020/129341
PCT Pub. Date: Jun. 25, 2020

(65) Prior Publication Data
US 2022/0107285 A1 Apr. 7, 2022

(30) Foreign Application Priority Data
Dec. 17, 2018 (JP) ................. 2018-235644

(51) Int. Cl.
*G01N 27/18* (2006.01)
(52) U.S. Cl.
CPC .................. *G01N 27/18* (2013.01)
(58) Field of Classification Search
CPC ........................................... G01N 27/18
See application file for complete search history.

(56) References Cited

U.S. PATENT DOCUMENTS

| | | | |
|---|---|---|---|
| 8,689,608 B2 * | 4/2014 | Nakano | G01N 25/18 73/25.05 |
| 9,244,032 B2 * | 1/2016 | Kitanoya | G01N 27/18 |
| 10,101,286 B2 * | 10/2018 | Nakano | G01N 33/005 |
| 11,499,932 B2 * | 11/2022 | Kaita | G01N 33/006 |
| 11,567,025 B2 * | 1/2023 | Matsuo | G01N 27/18 |

FOREIGN PATENT DOCUMENTS

JP 2017-009472 A 1/2017

OTHER PUBLICATIONS

International Search Report issued in corresponding International Patent Application No. PCT/JP2019/037256, dated Nov. 5, 2019, with English translation.

* cited by examiner

*Primary Examiner* — Freddie Kirkland, III
(74) *Attorney, Agent, or Firm* — Rimon P.C.; Tomoki Tanida

(57) ABSTRACT

A gas sensor includes a feedback circuit part and a sensor circuit part. The feedback circuit part includes a reference resistor and a first temperature sensing element which are connected in series, a first heater resistor that heats the first temperature sensing element, and a first amplifier circuit that controls the amount of current to flow in the first heater resistor based on an internal potential. The sensor circuit part includes a second temperature sensing element and a second heater resistor that heats the second temperature sensing element. A current according to the output of the first amplifier circuit flows in the second heater resistor. With this configuration, it is possible to automatically change the amount of current to flow in the second heater resistor according to ambient temperature without digital processing to thereby heat the second temperature sensing element to a constant temperature.

15 Claims, 17 Drawing Sheets

GAS SENSOR

CROSS REFERENCE

This application is the U.S. National Phase under 35 US.C. § 371 of International Application No. PCT/JP2019/037256, filed on Sep. 24, 2019, which claims the benefit of Japanese Application No. 2018-235644, filed on Dec. 17, 2018, the entire contents of each are hereby incorporated by reference.

TECHNICAL FIELD

The present invention relates to a gas sensor for detecting gas contained in the atmosphere and, more particularly, to a gas sensor provided with a heater resistor for heating a temperature sensing element such as a thermistor.

BACKGROUND ART

Gas sensors detect the concentration of a gas to be measured contained in the atmosphere, and gas sensors of a type that heats a temperature sensing element such as thermistor with a heater resistor is advantageously small in size. For example, in a gas sensor described in Patent Document 1, a thermistor heated by a heater resistor and a reference resistor are connected in series, and the concentration of a gas to be measured is detected based on the potential at the connection point therebetween.

The gas sensor described in Patent Document 1 further has an ambient temperature sensing element. The amount of current to flow in the heater resistor is finely adjusted according to ambient temperature obtained by the ambient temperature sensing element, whereby the thermistor is heated at a constant temperature without being influenced by ambient temperature. The gas sensor described in Patent Document 1 AD-converts a voltage value output from the ambient temperature sensing element, calculates an indicative value indicating the amount of current to flow in the heater resistor based on the obtained digital value, and DA-converts the indicative value to generate current to flow in the heater resistor.

CITATION LIST

Patent Document

[Patent Document 1] JP 2017-9472A

SUMMARY OF THE INVENTION

Problem to be Solved by the Invention

However, the method described in Patent Document 1 requires an increase in the number of bits of the AD converter and DA converter in order to control the current to flow in the heater resistor with high accuracy, disadvantageously increasing circuit scale. Further, errors can occur in the calculation of the indicative value, so that it is not easy to control the current to flow in the heater resistor with high accuracy. In addition, a predetermined period of time is required for the AD conversion, calculation, and DA conversion, so that it is also not easy to increase response speed with respect to a change in ambient temperature.

It is therefore an object of the present invention to automatically change the amount of current to flow in a heater resistor according to ambient temperature without digital processing in a gas sensor of a type that heats a temperature sensing element such as a thermistor with a heater resistor.

Means for Solving the Problem

A gas sensor according to the present invention includes: a feedback circuit part including a reference resistor and a first temperature sensing element which are connected in series, a first heater resistor that heats the first temperature sensing element, and a first amplifier circuit that controls the amount of current to flow in the first heater resistor based on the potential at the connection point between the reference resistance and the first temperature sensing element; and a sensor circuit part including a second temperature sensing element whose resistance value changes according to the concentration of a gas to be measured and a second heater resistor that heats the second temperature sensing element. A current according to the output of the first amplifier circuit flows in the second heater resistor.

According to the present invention, the output of the first amplifier circuit is fed back to the first heater resistor, allowing the first temperature sensing element to be heated to a constant temperature irrespective of ambient temperature. Further, a current according to the output of the first amplifier circuit flows in the second heater resistor for heating the second temperature sensing element, allowing also the second temperature sensing element to be heated to a constant temperature irrespective of ambient temperature. Thus, it is possible to automatically change the amount of current to flow in the second heater resistor according to ambient temperature without digital processing to thereby heat the second temperature sensing element to a constant temperature.

In the present invention, the sensor circuit part may further include a second amplifier circuit that controls the amount of current to flow in the second heater resistor according to the output voltage of the first amplifier circuit. With this configuration, the first amplifier circuit and the second amplifier circuit can drive the first heater resistor and the second heater resistor, respectively. In this case, the amount of current flowing in the first heater resistor and the amount of current flowing in the second heater resistor may differ from each other. Such a configuration can be realized by setting different gains for the first and second amplifier circuits.

In the present invention, the sensor circuit part may further include a third temperature sensing element connected in series to the second temperature sensing element, a third heater resistor that heats the third temperature sensing element, and a third amplifier circuit that controls the amount current to flow in the third heater resistor according to the output voltage of the first amplifier circuit. With this configuration, it is possible to reduce measurement errors due to a change in a power supply potential. In this case, the amount of current flowing in the second heater resistor and the amount of current flowing in the third heater resistor may differ from each other. Such a configuration can be realized by setting different gains for the second and third amplifier circuits.

In the present invention, the first and second heater resistors may be connected in series. With this configuration, it is possible to make current flow in the second heater resistor without using an amplifier circuit other than the first amplifier circuit. In this case, the sensor circuit part may further include a third temperature sensing element connected in series to the second temperature sensing element and a third heater resistor that heats the third temperature sensing element, and the first, second, and third heater resistors may be connected in series. With this configuration, it is possible to make current flow in the second and third heater resistors without using an amplifier circuit other than the first amplifier circuit.

The gas sensor according to the present invention may further include a current mirror circuit that makes current flow in the first and second heater resistors at a predetermined ratio. This allows current to flow in the first and second resistors at a desired ratio. In this case, the sensor circuit part may further include a third temperature sensing element connected in series to the second temperature sensing element and a third heater resistor that heats the third temperature sensing element, and the current mirror circuit may make current flow in the first, second, and third heater resistors at a predetermined ratio. This allows current to flow in the first, second, and third heater resistors at a desired ratio.

In the present invention, the sensor circuit part may further include a shunt resistor connected in parallel to the second heater resistor. With this confirmation, it is possible to adjust the current flowing in the second heater resistor using the shunt resister.

In the present invention, the sensor circuit part may further include an output amplifier that generates an output signal by comparing a potential at one end of the second temperature sensing element and a reference potential, and the first amplifier circuit may control the amount of current to flow in the first heater resistor by comparing a potential at the connection point and reference potential. With this configuration, it is possible to make a circuit configuration including the first temperature sensing element, first heater resistor, and first amplifier circuit and a circuit configuration including the second temperature sensing element, second heater resistor, and output amplifier substantially coincide with each other.

In the present invention, a first sensor element including the first temperature sensing element and first heater resistor and a second sensor element including the second temperature sensing element and second heater resistor may be housed in the same package. This allows ambient temperatures of the first and second sensor elements to substantially coincide with each other.

In the present invention, a first sensor element including the first temperature sensing element and first heater resistor and a second sensor element including the second temperature sensing element and second heater resistor may be integrated on the same substrate. This can reduce the number of components and allows ambient temperatures of the first and second sensor elements to substantially completely coincide with each other.

In the present invention, the temperature sensing element may be a thermistor. In this case, high detection sensitivity can be achieved.

Advantageous Effects of the Invention

As described above, according to the gas sensor of the present invention, it is possible to automatically change the amount of current to flow in the heater resistor according to ambient temperature without digital processing. This makes it possible to control the current to flow in the heater resistor with high accuracy and at high speed according to a change in ambient temperature while reducing the circuit scale.

MODE FOR CARRYING OUT THE INVENTION

Preferred embodiments of the present invention will be explained below in detail with reference to the accompanying drawings.

<Basic Configuration>

Figure 1:
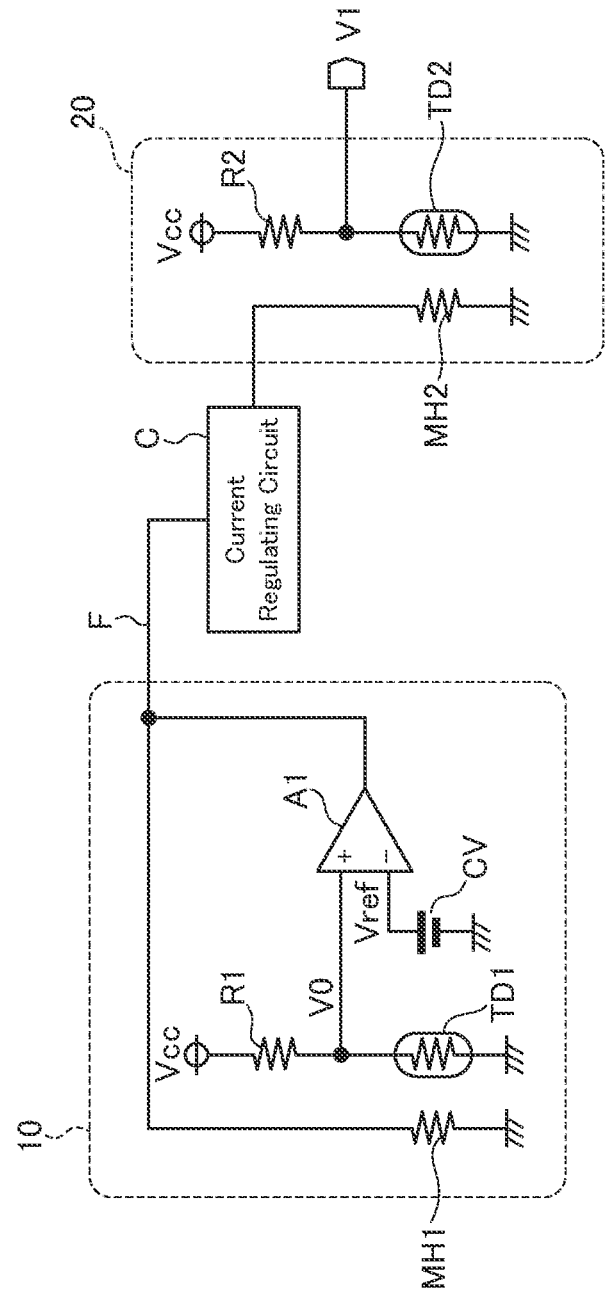
FIG. 1 is a circuit diagram of a gas sensor 1 according to the basic configuration of the present invention.

FIG. 1 is a circuit diagram of a gas sensor 1 according to the basic configuration of the present invention.

The gas sensor 1 according to the basic configuration illustrated in FIG. 1 has a feedback circuit part 10, a sensor circuit part 20, and a current regulating circuit C.

The feedback circuit part 10 is a circuit that generates a feedback output F according to ambient temperature and includes: a reference resistor R1 and a first temperature sensing element TD1 which are connected in series; a first heater resistor MH1 that heats the first temperature sensing element TD1; and a first amplifier circuit A1 that generates the feedback output F based on an internal potential V0 appearing at the connection point between the reference resistor R1 and the first temperature sensing element TD1. The first amplifier circuit A1 compares a reference potential Vref from a constant voltage source CV and the internal a potential V0 and generates the feedback output F based on a result of the comparison. The feedback output F is supplied to the first heater resistor MH1 and also to the current regulating circuit C.

The first temperature sensing element TD1 may be any element whose resistance value changes depending on temperature. Specifically, the first temperature sensing element TD1 may be a thermistor made of a material having a negative resistance temperature coefficient, such as a composite metal oxide, amorphous silicon, polysilicon, or germanium, may be a thermistor made of a material having a positive resistance temperature coefficient, and may be a platinum temperature sensing element. However, the first temperature sensing element TD1 preferably does not change in resistance value according to the concentration of a gas to be measured and is at least required to undergo less changes in resistance value by a change in the concentration of a gas to be measured than a second temperature sensing element TD2 included in the sensor circuit part 20. The connection relation between the first temperature sensing element TD1 and the first amplifier circuit A1 illustrated in FIG. 1 is set when the first temperature sensing element TD1 is made of a material having a negative resistance temperature coefficient. In this case, as illustrated in FIG. 1, the internal potential V0 is input to the non-inverting input terminal (+) of the first amplifier circuit A1, and the reference potential Vref is input to the inverting input terminal (−) thereof. When the first temperature sensing element TD1 is made of a material having a positive resistance temperature coefficient, the referential potential Vref is input to the non-inverting input terminal (+) of the first amplifier circuit A1, and the internal potential V0 is input to the inverting input terminal (−) thereof.

The first heater resistor MH1 heats the first temperature sensing element TD1 at a predetermined first set temperature (e.g., about 300° C.). As a result, the resistance value of the first temperature sensing element TD1 becomes a predetermined value corresponding to the first set temperature. The reference potential Vref from the constant voltage source CV is set to a value equal to the internal potential V0 obtained when the first temperature sensing element TD1 is heated properly to the first set temperature. For example, when the resistance value of the reference resistor R1 and a resistance value obtained when the first temperature sensing element TD1 is heated properly to the first set temperature are equal to each other, the internal potential V0 obtained when the first temperature sensing element TD1 is heated properly to the first set temperature is half (Vcc/2) a power supply potential Vcc. In this case, the reference potential Vref from the constant voltage source CV is also set to Vcc/2.

When, due to a change in ambient temperature, the actual heating temperature for the first temperature sensing element TD1 deviates from the first set temperature, there occurs a difference between the reference potential Vref and the internal potential V0, which is then amplified by the first amplifier circuit A1 to change the feedback output F. For example, when the actual heating temperature for the first temperature sensing element TD1 is lower than the first set temperature, the feedback output F increases so as to make a heating temperature for the first temperature sensing element TD1 coincide with the first set temperature. Conversely, when the actual heating temperature for the first temperature sensing element TD1 is higher than the first set temperature, the feedback output F decreases so as to make a heating temperature for the first temperature sensing element TD1 coincide with the first set temperature. Such feedback control makes the actual heating temperature for the first temperature sensing element TD1 coincide with the first set temperature irrespective of ambient temperature. The polarity of the first amplifier circuit A1 may be determined depending on whether the first temperature sensing element TD1 has a negative resistance temperature coefficient or a positive resistance temperature coefficient.

The feedback output F is supplied not only to the first heater resistor MH1 but also to the current regulating circuit C. The current regulating circuit C may be a circuit element provided separately from the feedback circuit part 10 and sensor circuit part 20 or may be provided as a part of the feedback circuit part 10 or sensor circuit part 20.

The sensor circuit part 20 is a circuit that generates an output signal V1 according to the concentration of a gas to be measured and includes: a reference resistor R2 and a second temperature sensing element TD2 which are connected in series; and a second heater resistor MH2 that heats the second temperature sensing element TD2. The resistance value of the reference resistor R2 may be equal to the resistance value of the reference resistor R1. Although the second temperature sensing element TD2 may be any element whose resistance value changes depending on temperature, like the first temperature sensing element TD1, it preferably has the same configuration as the first temperature sensing element TD1 and at least needs to be the same in the sign (positive/negative) of the resistance temperature coefficient as the first temperature sensing element TD1. Further, the second temperature sensing element TD2 needs to be an element whose resistance value changes according to the concentration of a gas to be measured. The type of a gas to be measured is not particularly limited, and $CO_2$ gas, CO gas, and the like may be used as a gas to be measured.

The current flowing in the second heater resistor MH2 is regulated by the current regulating circuit C. The current regulating circuit C is a circuit that makes the same current as, or a current proportional to that flows in the first heater resistor MH1 flow in the second heater resistor MH2. Thus, the second temperature sensing element TD2 is heated to a predetermined second set temperature by the second heater resistor MH2. The second set temperature may be the same as the first set temperature.

When the feedback output F changes due to a change in ambient temperature, the amount of current flowing in the second heater resistor MH2 also changes. That is, an increase in the current flowing in the first heater resistor MH1 due to a decrease in ambient temperature automatically increases the amount of current flowing in the second heater resistor MH2; on the other hand, a decrease in the current flowing in the first heater resistor MH1 due to an increase in ambient temperature automatically reduces the amount of current flowing in the second heater resistor MH2. Thus, it is possible to properly heat the second temperature sensing element TD2 to the second set temperature irrespective of ambient temperature.

As described above, the gas sensor 1 according to the basic configuration of the present invention uses the feedback circuit part 10 to perform feedback control so as to always heat the first temperature sensing element TD1 to the first set temperature and uses the current regulating circuit C to regulate the current flowing in the second heater resistor MH2 based on the feedback output F generated by the feedback circuit part 10, thereby allowing the second temperature sensing element TD2 to be always heated to the second set temperature irrespective of ambient temperature. In addition, the current flowing in the second heater resistor MH2 is automatically regulated in real time in an analog fashion, so that it is possible to control the current flowing in the second heater resistor MH2 with smaller circuit scale, with higher accuracy and at higher speed than a case of performing digital processing using an A/D converter and a D/A converter.

Hereinafter, embodiments of the present invention will be described.

First Embodiment

Figure 2:
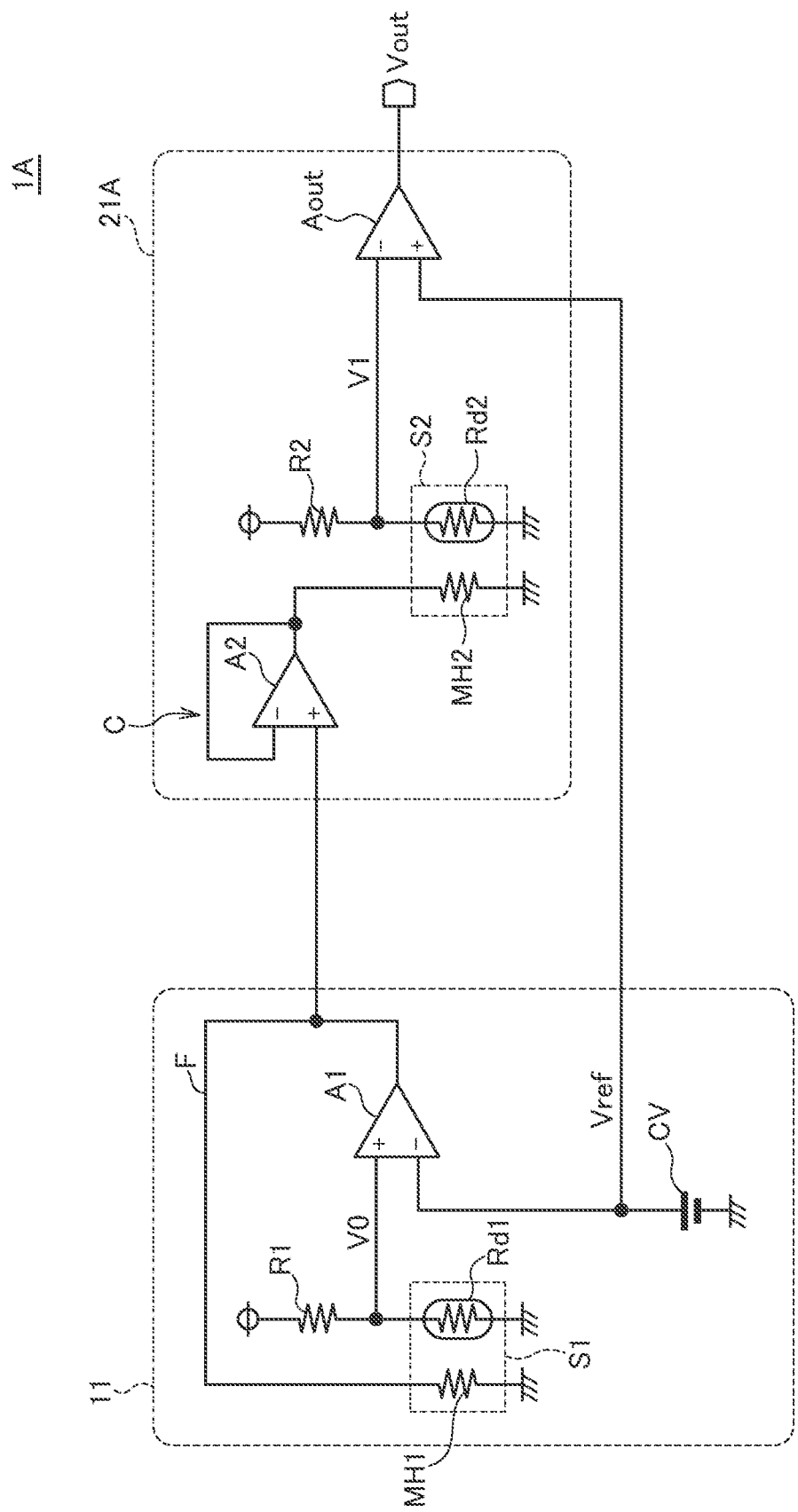
FIG. 2 is a circuit diagram of a gas sensor 1A according to a first embodiment of the present invention.

FIG. 2 is a circuit diagram of a gas sensor 1A according to a first embodiment of the present invention.

As illustrated in FIG. 2, the gas sensor 1A according to the first embodiment of the present invention is composed of a feedback circuit part 11 and the sensor circuit part 21A. The feedback circuit part 11 and sensor circuit part 21A correspond respectively to the feedback circuit part 10 and the sensor circuit part 20 which are illustrated in FIG. 1, so the same reference numerals are given to the same elements, and overlapping description will be omitted. A first thermistor Rd1 and first heater resistor MH1, which are included in the feedback circuit part 11, constitute a first sensor element S1. Similarly, a second thermistor Rd2 and second heater resistor MH2, which are included in the sensor circuit part 21A, constitute a second sensor element S2. The first thermistor Rd1 and the second thermistors Rd2 correspond respectively to the first temperature sensing element TD1 and the second temperature sensing element TD2.

In the present embodiment, a second amplifier circuit A2 is connected between the first amplifier circuit A1 and the second heater resistor MH2. The second amplifier circuit A2 is a voltage follower. Thus, the same voltage as the output voltage of the first amplifier circuit A1 is applied to the second heater resistor MH2. In the present embodiment, the second amplifier circuit A2 constituting a voltage follower corresponds to the current regulating circuit C.

Thus, when the first heater resistor MH1 and second heater resistor MH2 have the same resistance value, and the first thermistor Rd1 and second thermistor Rd2 have the same configuration, exactly the same amount of current flows in the first heater resistor MH1 and second heater resistor MH2, with the result that the first thermistor Rd1 and second thermistor Rd2 are heated to exactly the same temperature. As described in relation to the basic configuration, the first thermistor Rd1 is heated to a constant temperature (first set temperature) by feedback control irrespective of ambient temperature, so that the second thermistor Rd2 is also heated to a constant temperature (second set temperature) irrespective of ambient temperature.

An internal potential V1 appearing at the connection point between a second reference resistor R2 and the second thermistor Rd2 is supplied to an output amplifier Aout. The output amplifier Aout compares the internal potential V1 and the reference potential Vref and generates an output signal Vout based on a result of the comparison. The level of the output signal Vout is proportional to the concentration of a gas to be measured.

Thus, the gas sensor 1A illustrated in FIG. 2 can heat the first thermistor Rd1 and the second thermistor Rd2 to the same temperature and can thus be suitably applied to a catalytic combustion type gas sensor. In this case, a catalyst promoting combustion of a gas to be measured, such as CO gas, is added to the second thermistor Rd2, whereas such a catalyst is not added to the first thermistor Rd1. Alternatively, such a catalyst may be added both to the first and second thermistors Rd1 and Rd2; in this case, the catalyst is shielded so as not to allow a gas to be measured, such as CO gas, to reach the catalyst.

The second amplifier circuit A2, which is a voltage follower, is used in the gas sensor 1A illustrated in FIG. 2; however, when the drive capability of the first amplifier circuit A1 is sufficiently high, the first amplifier circuit A1 and the second heater resistor MH2 may be directly connected to each other without use of the second amplifier circuit A2.

The first heater resistor MH1 and second heater resistor MH2 need not have the same resistance value and may have mutually different resistance values. For example, the resistance value of the second heater resistor MH2 may be set to twice the resistance value of the first heater resistor MH1. In this case, the current flowing in the second heater resistor MH2 is half the current flowing in the first heater resistor MH1. By thus making the first and second thermistors Rd1 and Rd2 be heated at mutually different temperatures, the gas sensor 1A is suitably applied to a heat conduction type gas sensor. For example, when a heating temperature (first set temperature) for the first thermistor Rd1 is set to 300° C., and a heating temperature (second set temperature) for the second thermistor Rd2 is set to 150° C., $CO_2$ gas can be used as a gas to be measured. This is because the thermal conductivity of $CO_2$ gas significantly differs from the thermal conductivity of air in an environment of 150° C., whereas they have little difference in an environment of 300° C.

Figure 3:
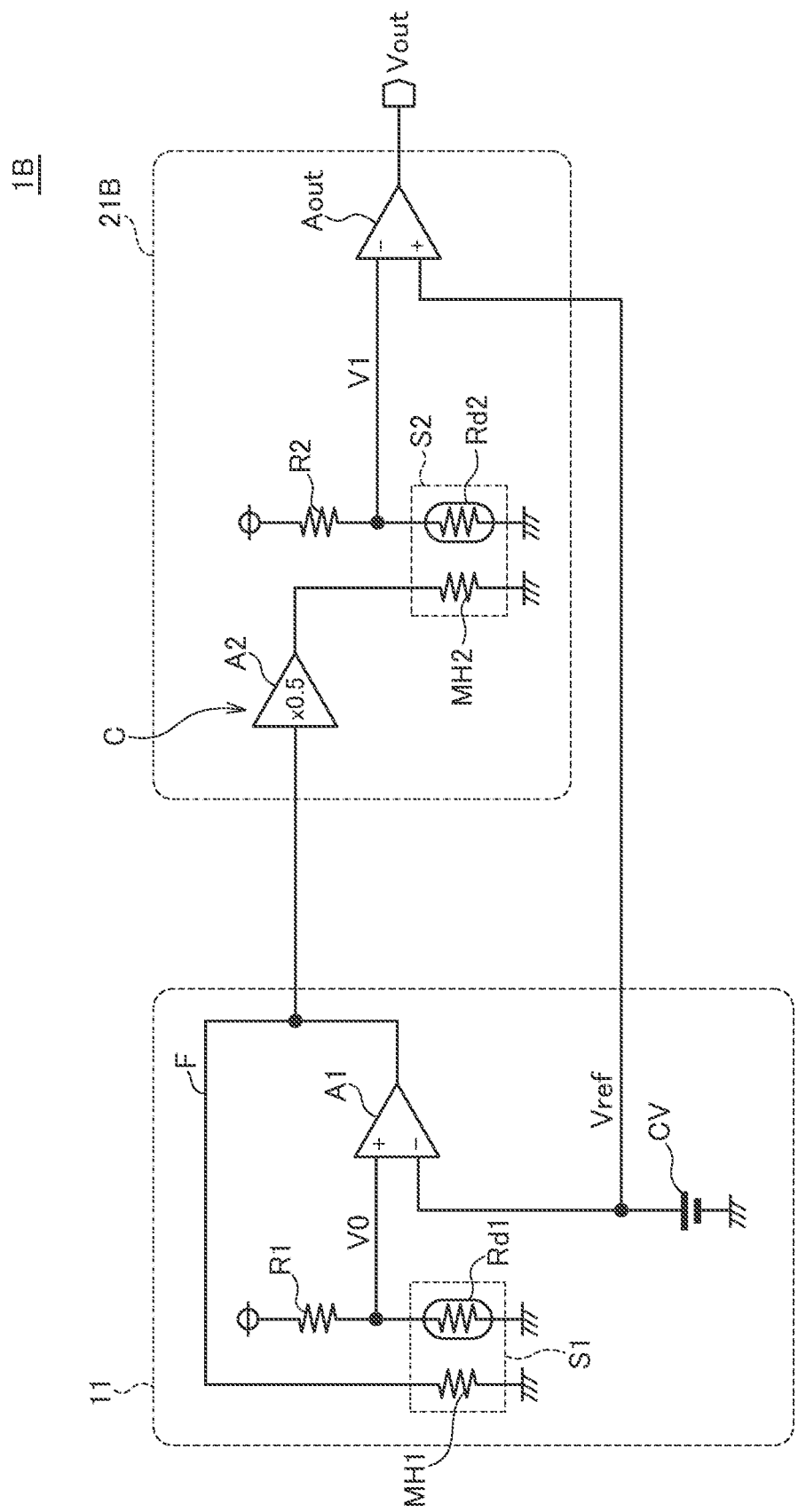
FIG. 3 is a circuit diagram of a gas sensor 1B according to a modification of the first embodiment.

FIG. 3 is a circuit diagram of a gas sensor 1B according to a modification of the first embodiment.

The gas sensor 1B according to the modification illustrated in FIG. 3 differs from the gas sensor 1A illustrated in FIG. 2 in that the second amplifier circuit A2 included in a sensor circuit part 21B is not a voltage follower but has a gain of 0.5. Other basic configurations are the same as those of the gas sensor 1A illustrated in FIG. 2, so the same reference numerals are given to the same elements, and overlapping description will be omitted.

In the gas sensor 1B according to the modification illustrated in FIG. 3, the second amplifier circuit A2 has a gain of 0.5, so that the voltage applied to the second heater resistor MH2 is half the voltage applied to the first heater resistor MH1. Thus, even when the first heater resistor MH1 and the second heater resistor MH2 have the same resistance value, the amount of heat generated by the second heater resistor MH2 is half that generated by the first heater resistor MH1. Thus, the gas sensor 1B according to the modification is suitably applied to a heat conduction type gas sensor.

The following describes specific device structures of the first and second sensor elements S1 and S2.

First Example

Figure 4:
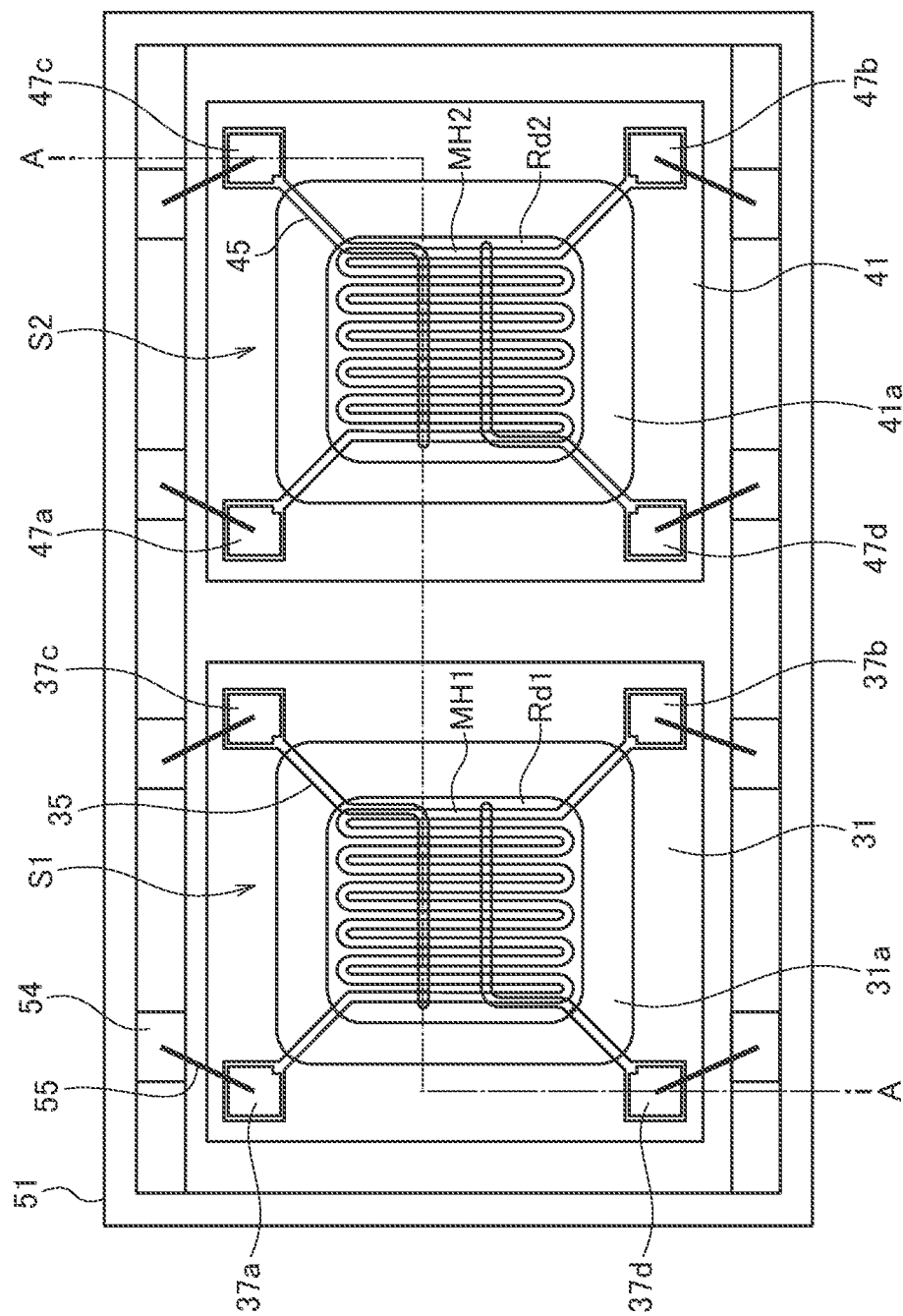
FIG. 4 is a top view for explaining the device structures of the first and second sensor elements S1 and S2 according to a first example.
Figure 5:
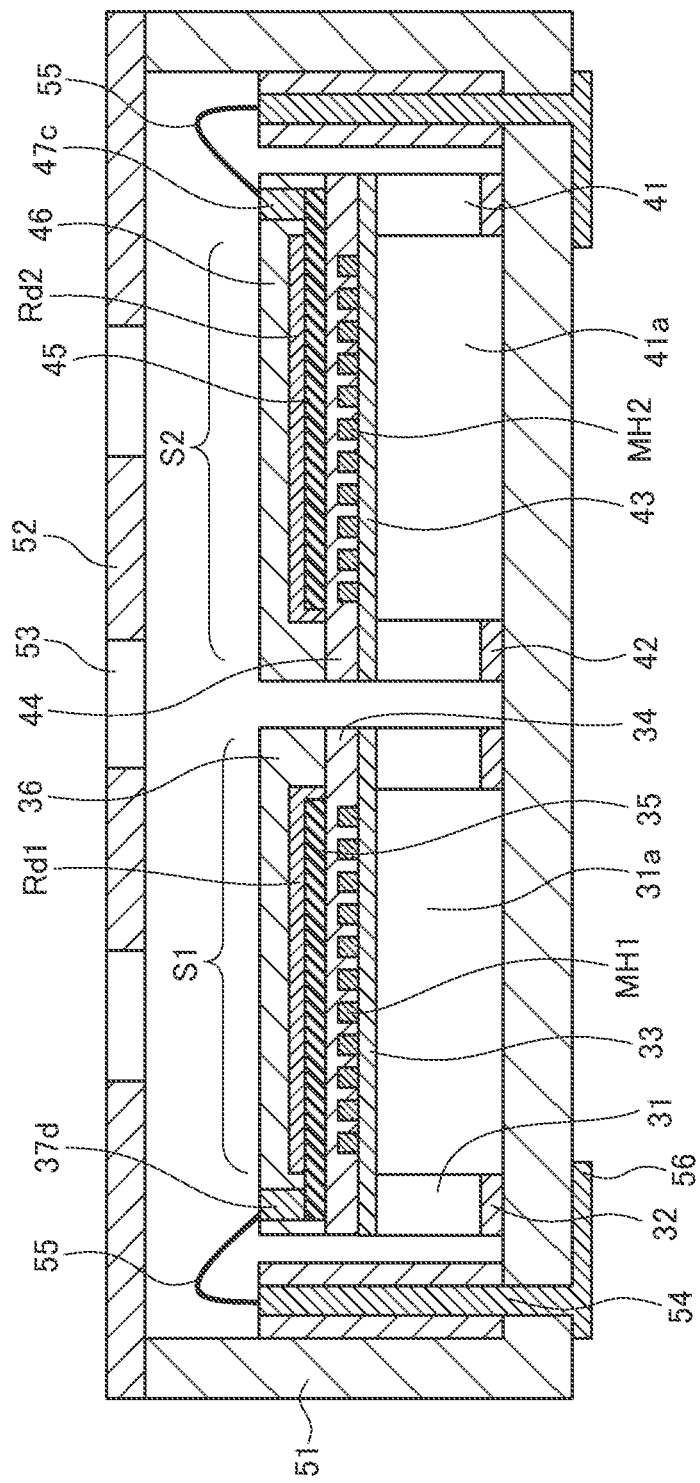
FIG. 5 is a cross-sectional view taken along the line A-A in FIG. 4.

FIG. 4 is a top view for explaining the device structures of the first and second sensor elements S1 and S2 according to a first example. FIG. 5 is a cross-sectional view taken along the line A-A in FIG. 4. The drawings are schematic, and the relation between thickness and plane dimension, ratio between thicknesses of devices, and the like may be different from those in the actual structure within a range in which the effect of the present embodiment can be obtained.

As illustrated in FIGS. 4 and 5, the first and second sensor elements S1 and S2 according to the first example are housed in a ceramic package 51. The ceramic package 51 is a box-shaped case having an open top and has a lid 52 at the top. The lid 52 has a plurality of vent holes 53, through which a gas to be measured (e.g., $CO_2$ gas or CO gas) in the atmosphere can flow into the ceramic package 51. In FIG. 4, the illustration of the lid 52 is omitted for simplicity.

It is the second sensor element S2 that actually detects a gas to be measured, and the first sensor element S1 serves as a reference element. Thus, when the gas sensor 1A or 1B according to the present embodiment is a heat conduction type sensor, the second thermistor Rd2 included in the second sensor element S2 is heated to a temperature at which the resistance value thereof changes according to the concentration of a gas to be measured, whereas the first thermistor Rd1 included in the first sensor element S1 is heated to a temperature at which the resistance value thereof does not change or slightly changes according to the concentration of a gas to be measured. When the gas sensor 1A or 1B according to the present embodiment is a catalytic combustion type gas sensor, the second sensor element S2 is provided with a catalyst promoting combustion of a gas to be measured, whereas the first sensor element S1 is not provided with such a catalyst.

The first sensor element S1 includes insulating films 32 and 33 formed respectively on the lower and upper surfaces of a substrate 31, a first heater resistor MH1 provided on the insulating film 33, a heater protective film 34 covering the first heater resistor MH1, a first thermistor Rd1 and a thermistor electrode 35 which are provided on the heater protective film 34, a thermistor protective film 36 covering the first thermistor Rd1 and thermistor electrode 35.

There is no particular restriction on the material of the substrate 31 as long as it has an adequate mechanical strength and is suitable for fine processing such as etching, and, examples thereof include a silicon single crystal substrate, a sapphire single crystal substrate, a ceramic substrate, a quartz substrate, a glass substrate, and the like. A cavity 31a is provided at a position overlapping the first heater resistor MH1 in a plan view so as to suppress conduction of heat due to the first heater resistor MH1 to the substrate 31. A part where the substrate 31 is removed by the cavity 31a is called a membrane. The presence of the membrane reduces heat capacity by the thinning of the substrate 31, allowing heating to be achieved with less power consumption.

The insulating films 32 and 33 are each made of an insulating material such as silicon oxide or silicon nitride. When silicon oxide is used as the insulating films 32 and 33, a film deposition method such as a thermal oxidation method or a CVD (Chemical Vapor Deposition) method may be used. There is no particular restriction on the thickness of the insulating films 32 and 33 as long as the insulating property thereof is ensured and may be, e.g., about 0.1 µm to 1.0 µm. Particularly, the insulating film 33 is used also as an etching stop layer when the cavity 31a is formed in the substrate 31, so that the thickness thereof is preferably set to a value suitable for fulfilling the function as the etching stop layer.

The first heater resistor MH1 is made of a conductive substance whose resistivity changes depending on temperature and is preferably made of a metal material having a comparatively high melting point, such as molybdenum (Mo), platinum (Pt), gold (Au), tungsten (W), tantalum (Ta), palladium (Pd), iridium (Ir), or an alloy containing two or more of them. Among them, a conductive material that can be subjected to high accuracy dry etching such as ion milling is preferable, and more preferably, it contains platinum (Pt) having high corrosion resistance as a main component. Further, an adhesion layer such as a titanium (Ti) layer is preferably formed as a base of Pt so as to improve adhesion with respect to the insulating film 33.

The heater protective film 34 is formed above the first heater resistor MH1. The heater protective film 34 is preferably made of the same material as the insulating film 33. The first heater resistor MH1 generates violent thermal changes (repetition of temperature rises between room temperature to 150° C. or 300° C., for example, and then a drop to room temperature again), so that strong thermal stress is applied to the insulating film 33 and heater protective film 34. When being continuously subject to the thermal stress, the insulating film 33 and heater protective film 34 may suffer damage such as interlayer peeling or crack. However, when the insulating film 33 and the heater protective film 34 are made of the same material, material characteristics thereof are the same, and adhesion strength therebetween is high, so that the damage such as interlayer peeling or crack is less likely to occur as compared to when the insulating film 33 and the heater protective film 34 are made of mutually different materials. When silicon oxide is used as the material of the heater protective film 34, film deposition may be performed by a thermal oxidation method or a CVD method. The film thickness of the heater protective film 34 is not particularly restricted as long as insulation between the first thermistor Rd1 and the thermistor electrode 35 can be ensured and may be, e.g., 0.1 µm to 3.0 µm.

The first thermistor Rd1 is made of a material having a negative resistance temperature coefficient, such as a composite metal oxide, amorphous silicon, polysilicon, or germanium, and can be formed by using a thin-film process such as a sputtering method or a CVD method. The film thickness of the first thermistor Rd1 may be adjusted according to a target resistance value. For example, when the resistance value (R25) at room temperature is set to about 2 MΩ using MnNiCo based oxide, the film thickness may be set to about 0.2 µm to 1 µm although it depends on the distance between a pair of thermistor electrodes 35. The reason that the thermistor is used as a temperature-sensitive resistive element is that the thermistor is larger in resistance temperature coefficient than a platinum temperature sensing element and thus can obtain high detection sensitivity. Further, heat generation of the first heater resistor MH1 can be efficiently detected due to the thin-film structure. However, as described above, the first sensor element S1 is a reference element and does not change or hardly changes in resistance value depending on a gas to be measured.

The thermistor electrode 35 is configured of a pair of electrodes arranged spaced apart from each other at a predetermined interval, and the first thermistor Rd1 is provided between the pair of thermistor electrodes 35. With this configuration, the resistance value between the pair of thermistor electrodes 35 is determined by the resistance value of the first thermistor Rd1. The thermistor electrode 35 may be made of a conductive substance that can endure a process such as a film deposition step and a heat treatment process for the first thermistor Rd1 and is preferably made of a material having a comparatively high melting point, such as molybdenum (Mo), platinum (Pt), gold (Au), tungsten (W), tantalum (Ta), palladium (Pd), iridium (Ir), or an alloy containing two or more of them.

The first thermistor Rd1 and thermistor electrode 35 are covered with the thermistor protective film 36. When the first thermistor Rd1 is brought into contact with a material having reducibility so as to make it turn into a high-temperature state, the material deprives the thermistor of oxygen to cause a reduction, thus affecting thermistor characteristics. To prevent this, an insulating oxide film having no reducibility, such as silicon oxide film, is preferably used as the material of the thermistor protective film 36.

As illustrated in FIG. 4, both ends of the first heater resistor MH1 are connected respectively to electrode pads 37a and 37b. Further, both ends of the thermistor electrode 35 are connected respectively to electrode pads 37c and 37d. The electrode pads 37a to 37d are connected to a package electrode 54 installed to the ceramic package 51 through a bonding wire 55. The package electrode 54 is connected to the first amplifier circuit A1 and the like illustrated in FIG. 2 through an external terminal 56 provided on the back surface of the ceramic package 51.

As described above, the first sensor element S1 has a configuration in which the first heater resistor MH1 and first thermistor Rd1 are laminated on the substrate 31, so that heat generated by the first heater resistor MH1 is efficiently conducted to the first thermistor Rd1.

Similarly, the second sensor element S2 includes insulating films 42 and 43 formed respectively on the lower and upper surfaces of a substrate 41, a second heater resistor MH2 provided on the insulating film 43, a heater protective film 44 covering the second heater resistor MH2, a second thermistor Rd2 and a thermistor electrode 45 which are provided on the heater protective film 44, and a thermistor protective film 46 covering the second thermistor Rd2 and thermistor electrode 45.

The substrate 41 is made of the same material as the substrate 31 used for the first sensor element S1 and has the same configuration as the substrate 31. That is, a cavity 41a is provided at a position overlapping the second heater resistor MH2 in a plan view so as to suppress heat due to the second heater resistor MH2 from conducting to the substrate 41. The insulating films 42 and 43 are made of the same material (insulating material such as silicon oxide or silicon nitride) as the insulating films 32 and 33. The insulating films 42 and 43 have the same thickness as the insulating films 32 and 33.

The second heater resistor MH2, heater protective film 44, second thermistor Rd2, thermistor electrode 45, and thermistor protective film 46 have the same configurations as the first heater resistor MH1, the heater protective film 34, the first thermistor Rd1, the thermistor electrode 35, and the thermistor protective film 36, respectively, used for the first sensor element S1.

However, the first sensor element S1 is a reference element, while the second sensor element S2 needs to be configured such that the resistance value of the second thermistor Rd2 changes according to the concentration of a gas to be measured. That is, when the gas sensor 1A or 1B according to the present embodiment is a heat conduction type sensor, the second thermistor Rd2 included in the second sensor element S2 is heated to a temperature at which the resistance value thereof changes according to the concentration of a gas to be measured. When the gas sensor 1A or 1B according to the present embodiment is a catalytic combustion type sensor, the second sensor element S2 is provided with a catalyst promoting combustion of a gas to be measured.

One end and the other end of the second heater resistor MH2 are connected respectively to an electrode pad 47a and an electrode pad 47b. One and the other end of the thermistor electrode 45 are connected respectively to an electrode pad 47c and an electrode pad 47d. The electrode pads 47a to 47d are each connected to the package electrode 54 installed to the ceramic package 51 through the bonding wire 55. The package electrodes 54 are connected to the second amplifier circuit A2 and the output amplifier Aout illustrated in FIG. 2 through an external terminal 56 provided on the back surface of the ceramic package 51.

The thus configured sensor elements S1 and S2 are each produced in multiple numbers in a wafer state at a time, followed by dicing into individual pieces, and then fixed to the ceramic package 51 using a die paste (not illustrated). Thereafter, electrode pads 37a to 37d and 47a to 47d are connected to their corresponding package electrodes 54 through the bonding wires 55 using a wire bonding machine. As the material of the bonding wire 55, a metal having low resistance, such as Au, A1, or Cu is preferably used.

Finally, adhesive resin (not illustrated) or the like is used to fix the lid 52 having the outside air vent holes 53 to the ceramic package 51. Although a substance contained in the adhesive resin is turned into gas during heating/curing of the adhesive resin, the gas is easily discharged outside the package through the vent holes 53, so that the sensor elements S1 and S2 are hardly affected.

Second Example

Figure 6:
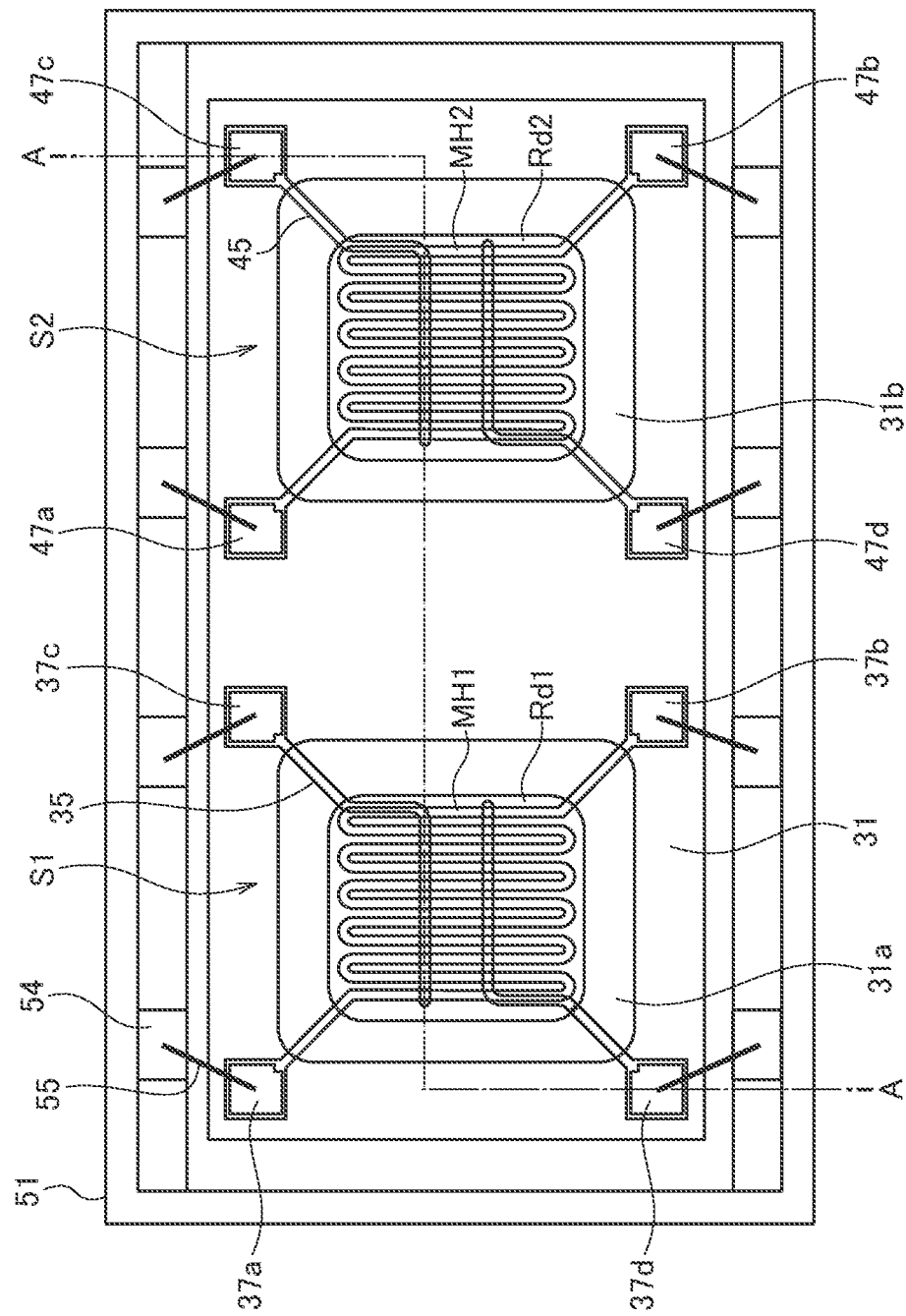
FIG. 6 is a top view for explaining the device structures of the first and second sensor elements S1 and S2 according to a second example.
Figure 7:
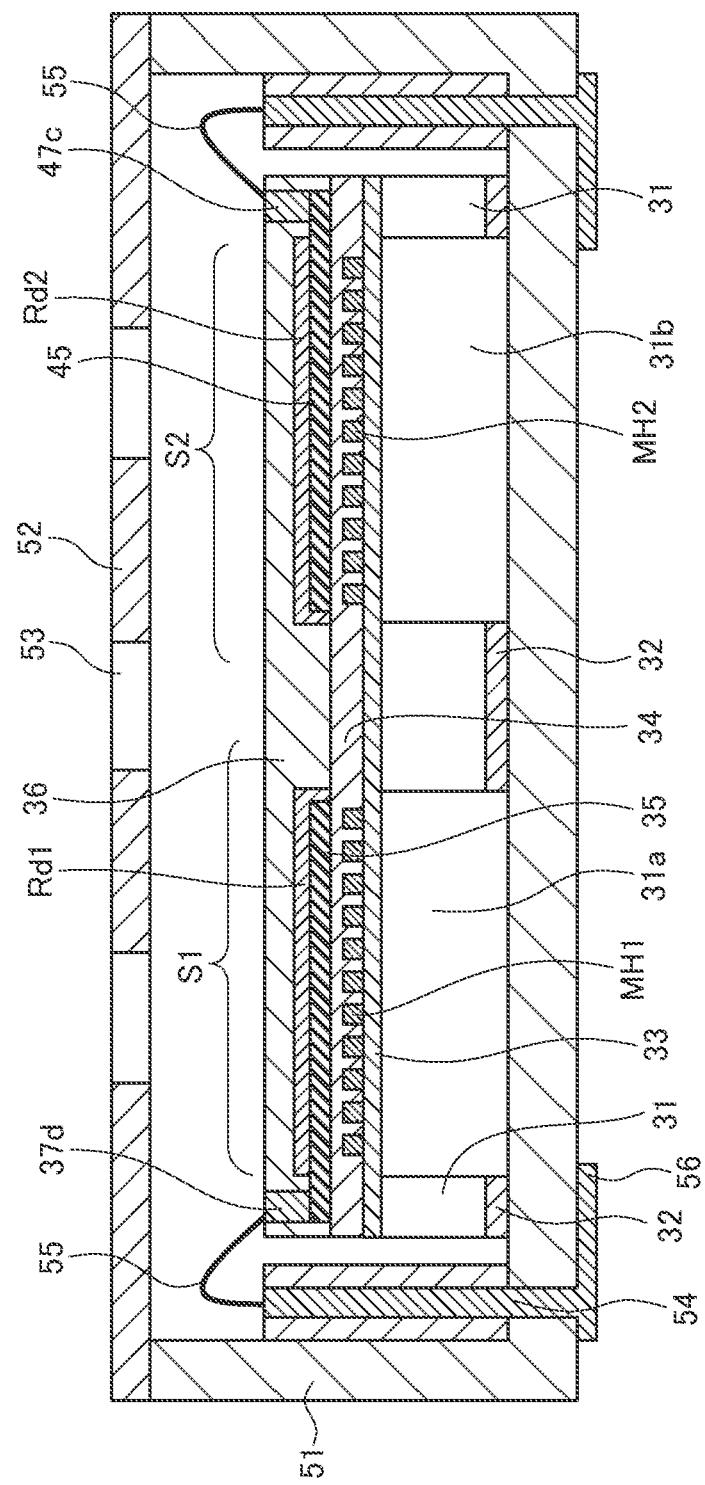
FIG. 7 is a cross-sectional view taken along the line A-A in FIG. 6.

FIG. 6 is a top view for explaining the device structures of the first and second sensor elements S1 and S2 according to a second example. FIG. 7 is a cross-sectional view taken along the line A-A in FIG. 6.

In the second example, as illustrated in FIGS. 6 and 7, the first and second sensor elements S1 and S2 are integrated on the same substrate 31. Further, a cavity 31b is provided at a position overlapping the second heater resistor MH2 in a plan view. Other basic configurations are the same as those of the first example illustrated in FIGS. 4 and 5, so the same reference numerals are given to the same elements, and overlapping description will be omitted. In this way, when the first and second sensor elements S1 and S2 are integrated on the same substrate 31, the number of components constituting the gas sensor can be reduced and temperature conditions of both the sensor elements S1 and S2 can substantially coincide with each other.

Second Embodiment

Figure 8:
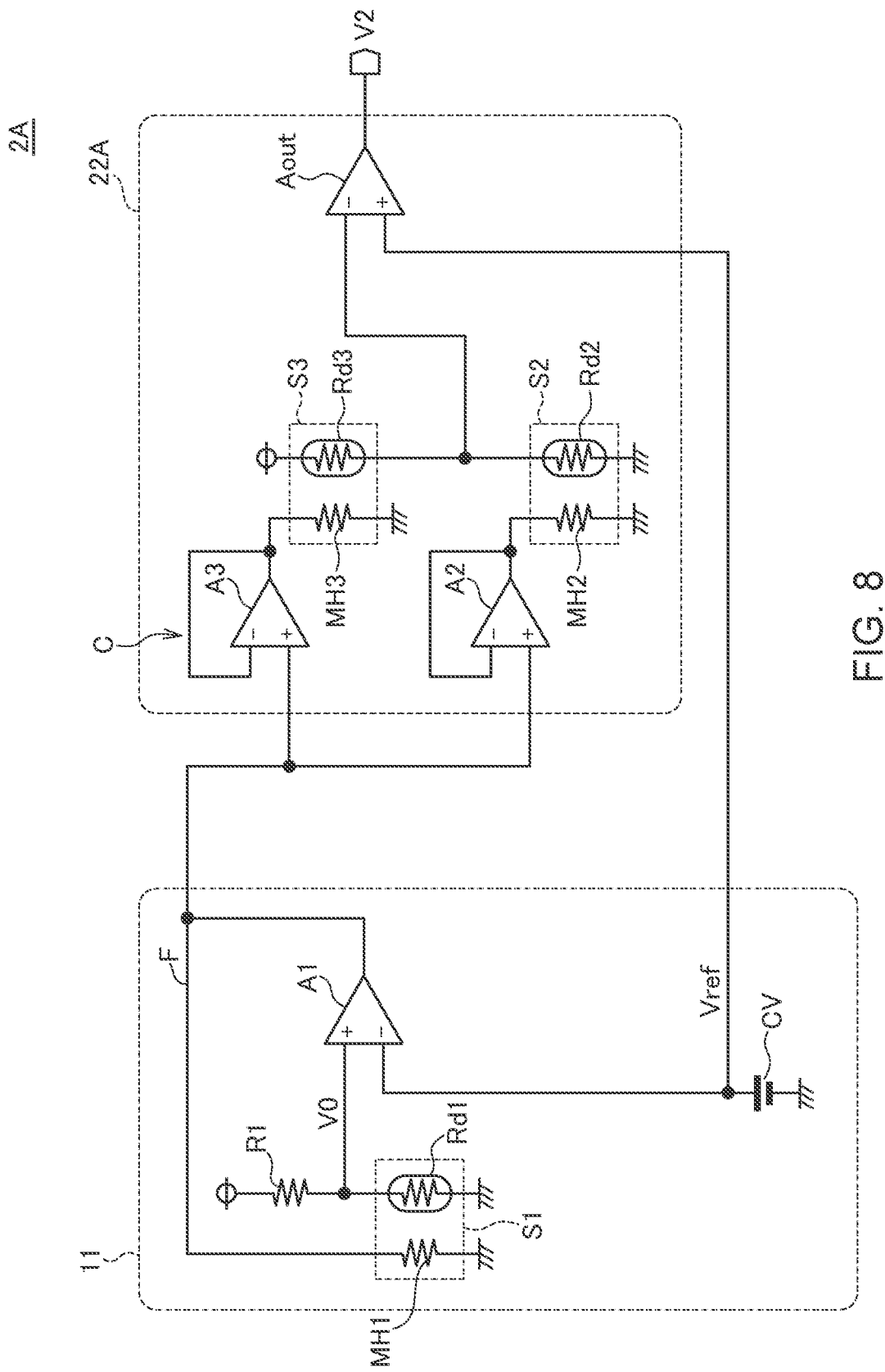
FIG. 8 is a circuit diagram of a gas sensor 2A according to a second embodiment of the present invention.

FIG. 8 is a circuit diagram of a gas sensor 2A according to a second embodiment of the present invention.

As illustrated in FIG. 8, the gas sensor 2A according to the second embodiment of the present invention is composed of the feedback circuit part 11 and a sensor circuit part 22A. The feedback circuit part 11 and the sensor circuit part 22A correspond respectively to the feedback circuit part 10 and sensor circuit part 20 which are illustrated in FIG. 1, so the same reference numerals are given to the same elements, and overlapping description will be omitted.

In the present embodiment, a third thermistor Rd3 is provided in place of the reference resistor R2. Further, there are newly added a third heater resistor MH3 for heating the third thermistor Rd3 and a third amplifier circuit A3 connected between the first amplifier circuit A1 and the third heater resistor MH3. The third amplifier circuit A3 is a voltage follower. Thus, the same voltage as the output voltage of the first amplifier circuit A1 is applied to the third heater resistor MH3. The third thermistor Rd3 and third heater resistor MH3 included in the sensor circuit part 22A constitute a third sensor element S3. In place of the third thermistor Rd3, a temperature sensing element made of a material different from that of the third thermistor Rd3 may be used. An example of this is a platinum temperature sensing element.

The third sensor element S3 is a reference element like the first sensor element S1 and does not change or hardly changes in resistance value depending on a gas to be measured. For example, when the gas sensor 2A is a catalytic combustion type gas sensor, a catalyst promoting combustion of a gas to be measured, such as CO gas, is added to the second thermistor Rd2, whereas such a catalyst is not added to the first and third thermistors Rd1 and Rd3.

When the first to third heater resistors MH1 to MH3 have the same resistance value, and the first to third thermistors Rd1 to Rd3 have the same configuration, exactly the same amount of current flows in the first to third heater resistors MH1 to MH3, with the result that the first to third thermistors Rd1 to Rd3 are heated to exactly the same temperature.

In the present embodiment, when the heating temperature for the second thermistor Rd2 changes due to a change in the power supply potential Vcc, the heating temperature for the third thermistor Rd3 changes correspondingly. This can reduce measurement errors due to a change in the power supply potential Vcc. Although not illustrated, in the present embodiment, the first to third sensor elements S1 to S3 are preferably housed in the same package and, more preferably, the first to third sensor elements S1 to S3 are integrated on the same substrate.

Figure 9:
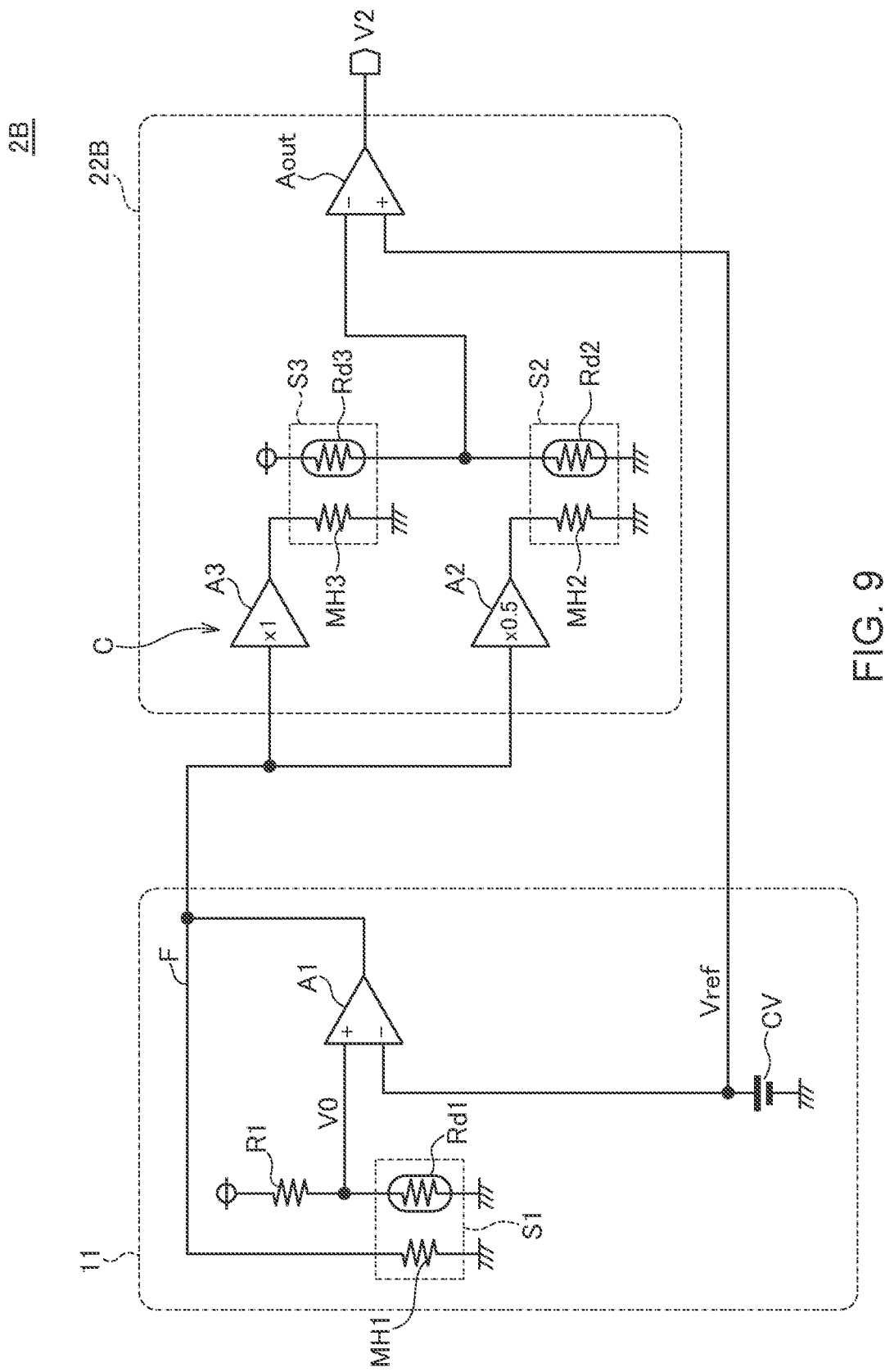
FIG. 9 is a circuit diagram of a gas sensor 2B according to a modification of the second embodiment.

FIG. 9 is a circuit diagram of a gas sensor 2B according to a modification of the second embodiment.

The gas sensor 2B according to the modification illustrated in FIG. 9 differs from the gas sensor 2A illustrated in FIG. 8 in that the second amplifier circuit A2 included in a sensor circuit part 22B is not a voltage follower but has a gain of 0.5. Other basic configurations are the same as those of the gas sensor 2A illustrated in FIG. 8, so the same reference numerals are given to the same elements, and overlapping description will be omitted.

In the gas sensor 2B according to the modification illustrated in FIG. 9, the second amplifier circuit A2 has a gain of 0.5 as in the gas sensor 1B illustrated in FIG. 3, so that the voltage applied to the second heater resistor MH2 is half the voltage applied to the first heater resistor MH1. Accordingly, the current flowing in the second heater resistor MH2 is half the current flowing in each of the first and third heater resistors MH1 And MH3, and the amount of heat generated by the second heater resistor MH2 is half that generated by each of the first and third heater resistors MH1 and MH3. As a result, the first and third thermistors Rd1 and Rd3 and the second thermistor Rd2 can be heated to mutually different temperatures, and thus the gas sensor 2B is suitably applied to a heat conduction type gas sensor.

Third Embodiment

Figure 10:
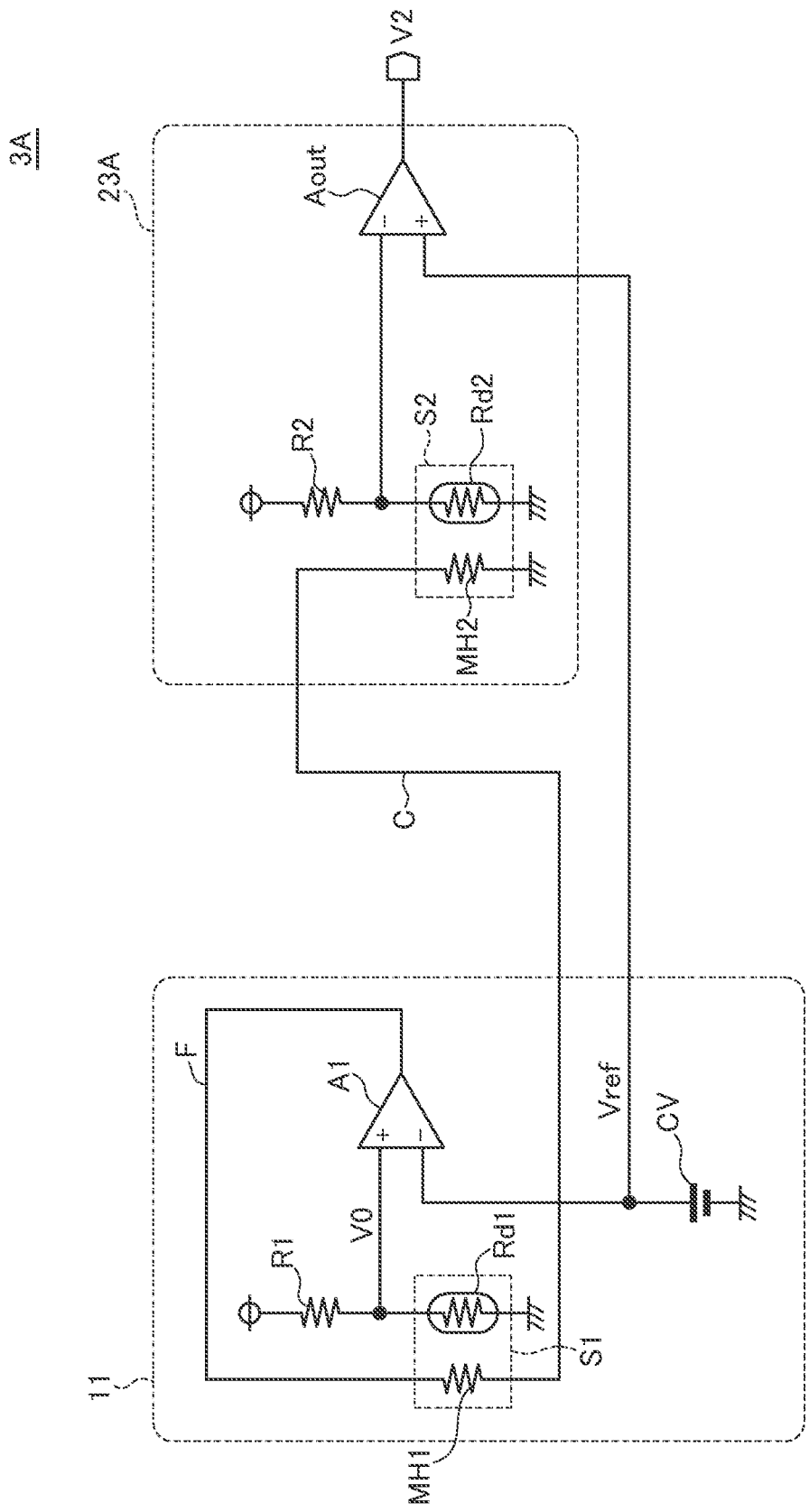
FIG. 10 is a circuit diagram of a gas sensor 3A according to a third embodiment of the present invention.

FIG. 10 is a circuit diagram of a gas sensor 3A according to a third embodiment of the present invention.

As illustrated in FIG. 10, the gas sensor 3A according to the third embodiment of the present invention is composed of the feedback circuit part 11 and a sensor circuit part 23A. The feedback circuit part 11 and the sensor circuit part 23A correspond respectively to the feedback circuit part 10 and the sensor circuit part 20 which are illustrated in FIG. 1, so the same reference numerals are given to the same elements, and overlapping description will be omitted.

In the present embodiment, the first heater resistor MH1 and the second heater resistor MH2 are connected in series. Specifically, the first heater resistor MH1 and the second heater resistor MH2 are connected in series between the output terminal of the first amplifier circuit A1 and the ground, and there is provided no path for shunting current in that part. Thus, the same current flows in the first heater resistor MH1 and second heater resistor MH2 without fail and, accordingly, the first thermistor Rd1 and second thermistor Rd2 are heated to the same temperature without fail. In the present embodiment, the wiring connecting the first heater resistor MH1 and the second heater resistor MH2 corresponds to the current regulating circuit C.

In the present embodiment, the first thermistor Rd1 and second thermistor Rd2 are heated to the same temperature not by performing voltage control using the second amplifier circuit A2 or the like but by making the current flowing in the first heater resistor MH1 flow in the second heater resistor MH2 as it is. This can simplify the circuit configuration of the sensor circuit part 23A.

Figure 11:
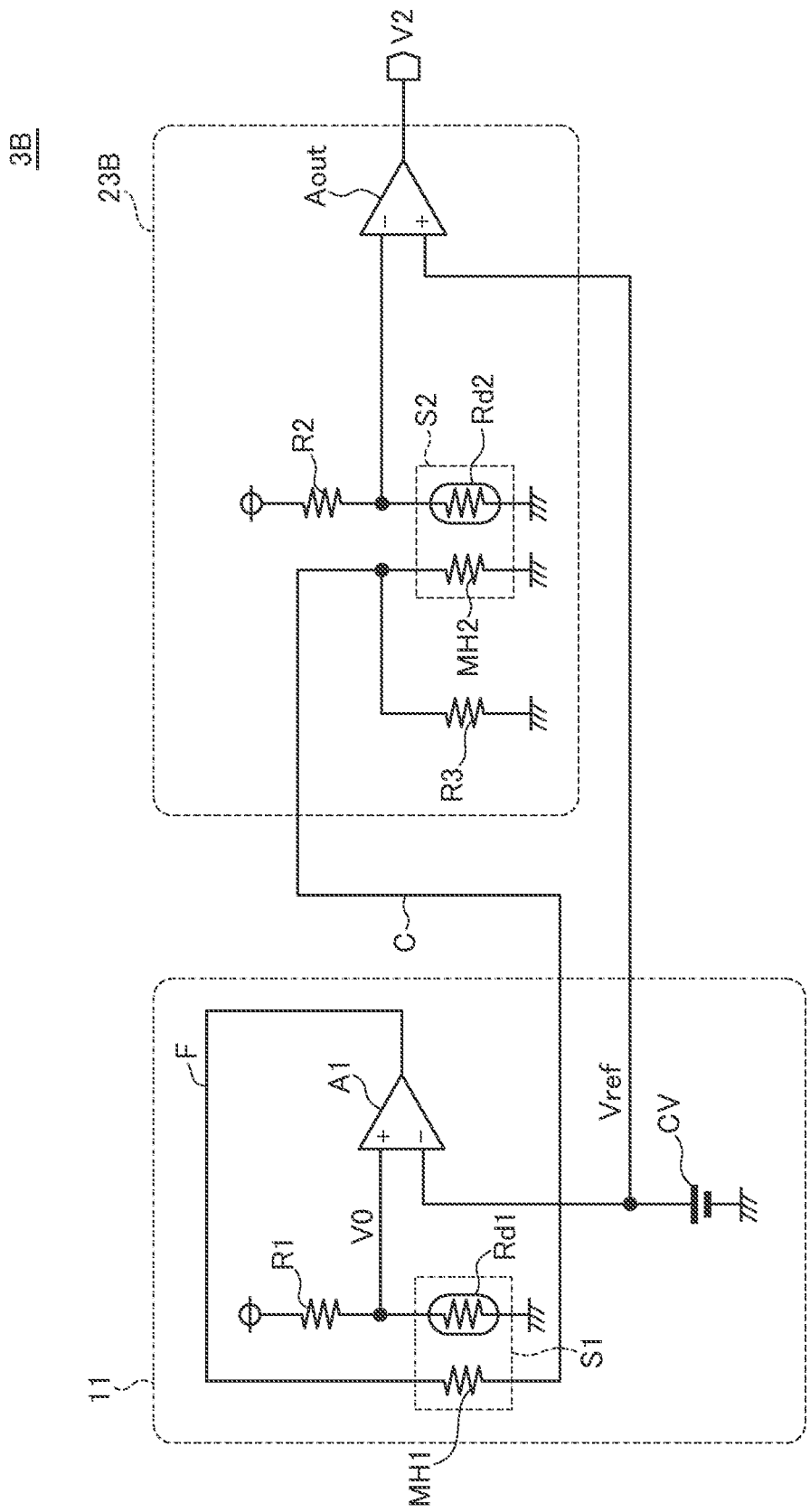
FIG. 11 is a circuit diagram of a gas sensor 3B according to a modification of the third embodiment.

FIG. 11 is a circuit diagram of a gas sensor 3B according to a modification of the third embodiment.

The gas sensor 3B according to the modification illustrated in FIG. 11 differs from the gas sensor 3A illustrated in FIG. 10 in that a shunt resistor R3 is added to a sensor circuit part 23B. Other basic configurations are the same as those of the gas sensor 3A illustrated in FIG. 10, so the same reference numerals are given to the same elements, and overlapping description will be omitted.

The shunt resistor R3 is connected in parallel to the second heater resistor MH2. Accordingly, the current flowing in the first heater resistor MH1 flows into the parallel connected second heater resistor MH2 and shunt resistor R3, with the result that the current flowing in the second heater resistor MH2 decreases according to the resistance ratio between the second heater resistor MH2 and the shunt resistor R3. For example, when the second heater resistor MH2 and the shunt resistor R3 have the same resistance value, the current flowing in the second heater resistor MH2 decreases to half, and the amount of heat generated by the second heater resistor MH2 is half that generated by the first heater resistor MH1. As a result, the first and second thermistors Rd1 and Rd2 can be heated to mutually different temperatures, and thus the gas sensor 3B is suitably applied to a heat conduction type gas sensor.

Fourth Embodiment

Figure 12:
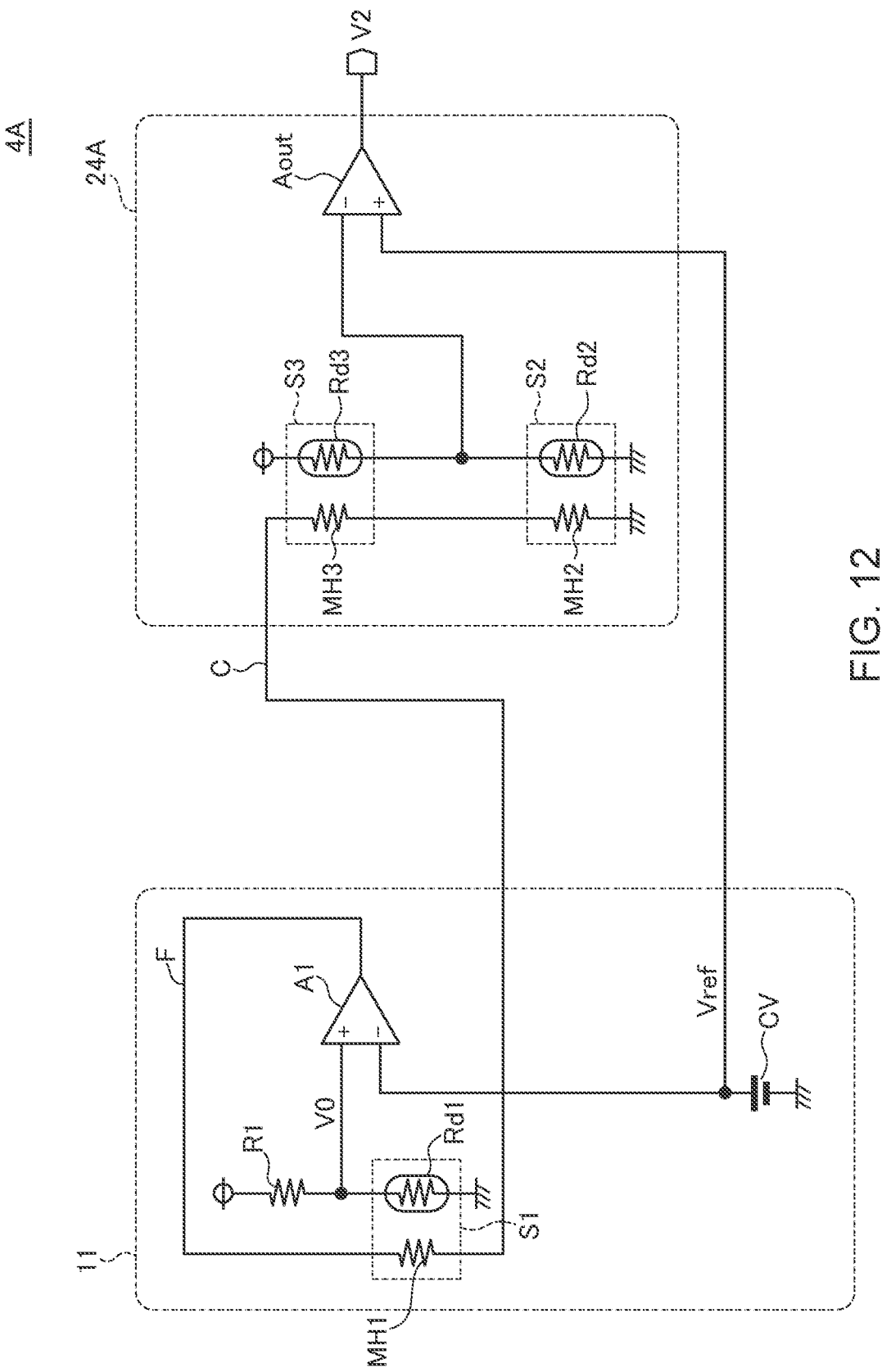
FIG. 12 is a circuit diagram of a gas sensor 4A according to a fourth embodiment of the present invention.

FIG. 12 is a circuit diagram of a gas sensor 4A according to a fourth embodiment of the present invention.

As illustrated in FIG. 12, the gas sensor 4A according to the fourth embodiment of the present invention is composed of the feedback circuit part 11 and a sensor circuit part 24A. The feedback circuit part 11 and the sensor circuit part 24A correspond respectively to the feedback circuit part 10 and the sensor circuit part 20 which are illustrated in FIG. 1, so the same reference numerals are given to the same elements, and overlapping description will be omitted.

In the present embodiment, a third thermistor Rd3 is provided in place of the reference resistor R2. Further, the first heater resistor MH1, third heater resistor MH3, and second heater resistor MH2 are connected in series in this order between the output terminal of the first amplifier circuit A1 and the ground. Thus, the same current flows in the first to third heater resistors MH1 to MH3 without fail and, accordingly, the first to third thermistors Rd1 to Rd3 are heated to the same temperature without fail. In the present embodiment, the wiring connecting the first heater resistor MH1 and the third heater resistor MH3 corresponds to the current regulating circuit C.

The third sensor element S3 is a reference element like the first sensor element S1 and does not change or hardly changes in resistance value depending on a gas to be measured. For example, when the gas sensor 2A is a catalytic combustion type gas sensor, a catalyst promoting combustion of a gas to be measured, such as CO gas, is added to the second thermistor Rd2, whereas such a catalyst is not added to the first and third thermistors Rd1 and Rd3.

In the present embodiment, the first to third thermistors Rd1 to Rd3 are heated to the same temperature not by performing voltage control using the second and third amplifier circuits A2 and A3 or the like but by making the current flowing in the first heater resistor MH1 flow in the second and third heater resistors MH2 and MH3 as it is. This can further simplify the circuit configuration.

Figure 13:
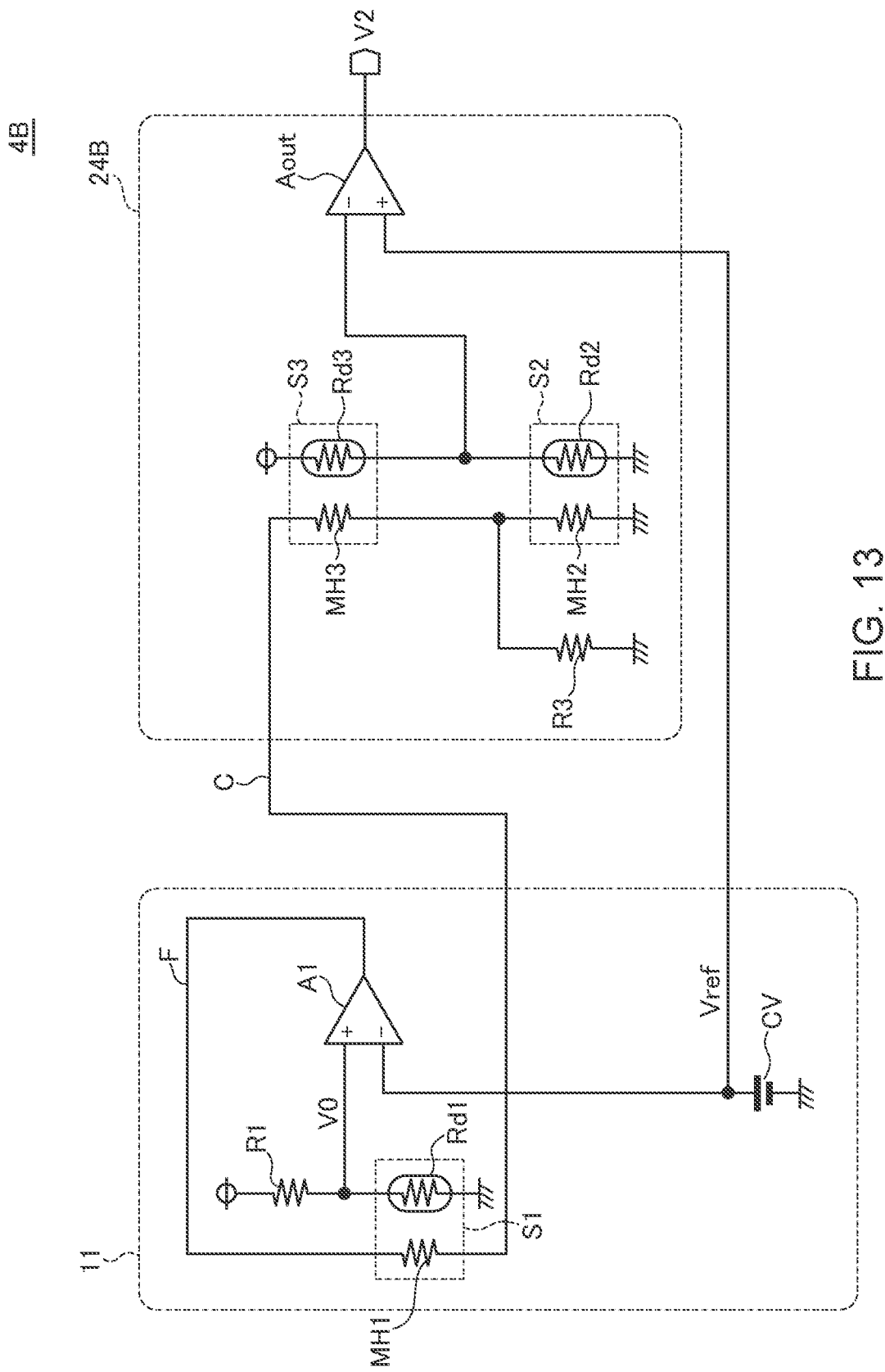
FIG. 13 is a circuit diagram of a gas sensor 4B according to a modification of the fourth embodiment.

FIG. 13 is a circuit diagram of a gas sensor 4B according to a modification of the fourth embodiment.

The gas sensor 4B according to the modification illustrated in FIG. 13 differs from the gas sensor 4A illustrated in FIG. 12 in that a shunt resistor R3 is added to a sensor circuit part 24B. Other basic configurations are the same as those of the gas sensor 4A illustrated in FIG. 12, so the same reference numerals are given to the same elements, and overlapping description will be omitted.

Like the gas sensor 3B illustrated in FIG. 11, the gas sensor 4B according to the modification illustrated in FIG. 13 has a configuration in which the shunt resistor R3 is connected in parallel to the second heater resistor MH2. Accordingly, the current flowing in the second heater resistor MH2 decreases. As a result, the first and third thermistors Rd1 and Rd3 and the second thermistor Rd2 can be heated to mutually different temperatures, and thus the gas sensor 4B is suitably applied to a heat conduction type gas sensor.

Fifth Embodiment

Figure 14:
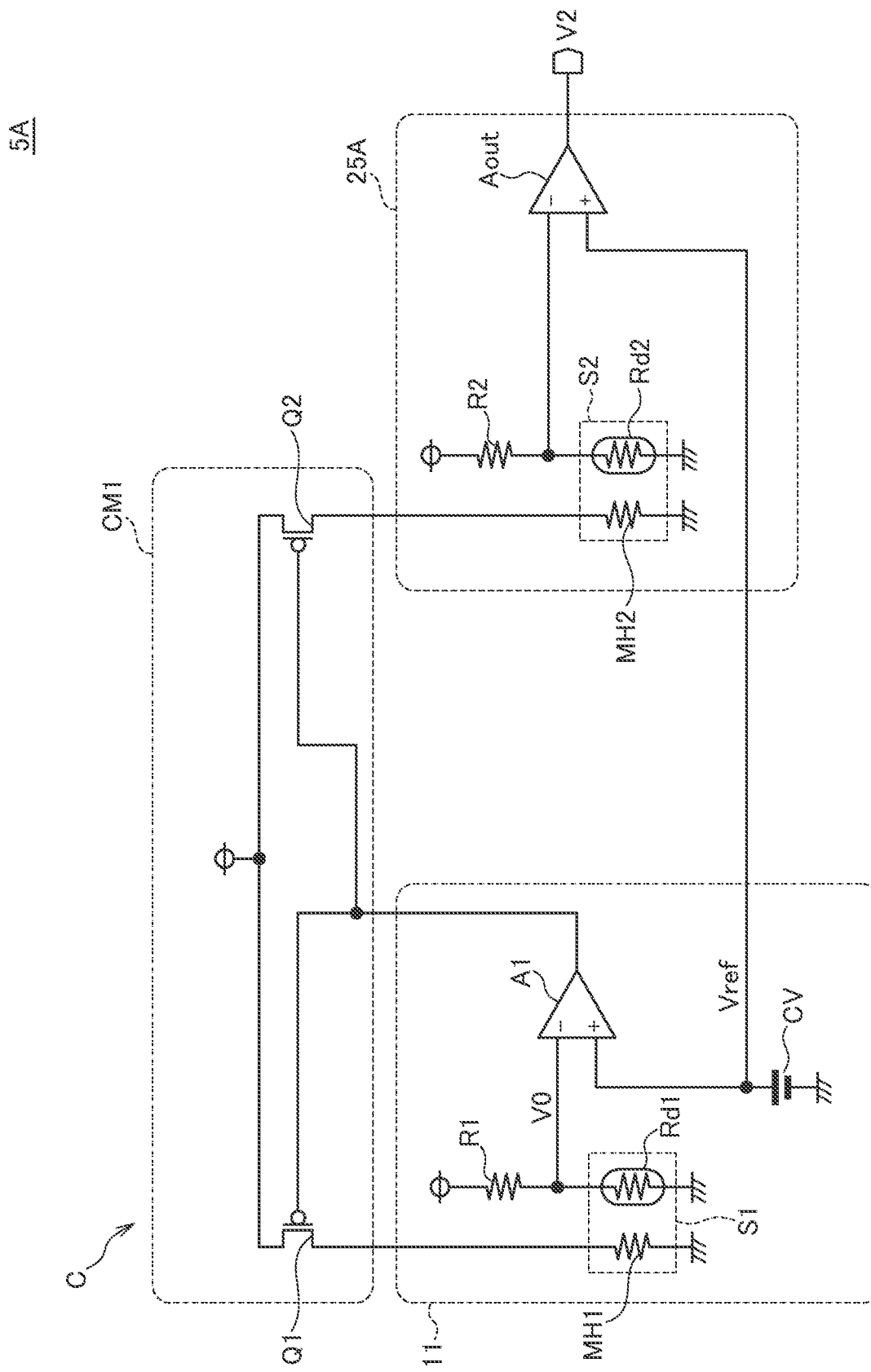
FIG. 14 is a circuit diagram of a gas sensor 5A according to a fifth embodiment of the present invention.

FIG. 14 is a circuit diagram of a gas sensor 5A according to a fifth embodiment of the present invention.

As illustrated in FIG. 14, the gas sensor 5A according to the fifth embodiment of the present invention is composed of the feedback circuit part 11, a sensor circuit part 25A, and a current mirror circuit CM1. The feedback circuit part 11 and the sensor circuit part 25A correspond respectively to the feedback circuit part 10 and the sensor circuit part 20 which are illustrated in FIG. 1, so the same reference numerals are given to the same elements, and overlapping description will be omitted. The sensor circuit part 25A has the same circuit configuration as the sensor circuit part 23A illustrated in FIG. 10. In the present embodiment, the internal potential V0 is input to the inverting input terminal (−) of the first amplifier circuit A1, and reference potential Vref is input to the non-inverting input terminal (+) thereof. However, when a material having a positive resistance temperature coefficient is used in place of the first thermistor Rd1, the reference potential Vref is input to the inverting input terminal (−) of the first amplifier circuit A1, and internal potential V0 is input to the non-inverting input terminal (+) thereof. The same applies to the following embodiments.

The current mirror circuit CM1 corresponds to the current regulating circuit C and has p-channel type MOS transistors Q1 and Q2. The transistor Q1 is connected in series to the first heater resistor MH1, and the transistor Q2 is connected in series to the second heater resistor MH2. The gate electrodes of the transistors Q1 and Q2 are supplied in common with the output of the first amplifier circuit A1. Thus, when the size ratio between the transistors Q1 and Q2 is 1:1, the same current flows in the transistors Q1 and Q2, with the result that the same current flows in the first heater resistor MH1 and second heater resistor MH2.

As exemplified in the present embodiment, it is possible to make the same current flow in the first heater resistor MH1 and second heater resistor MH2 by using the current mirror circuit CM1. Further, it is possible to set the ratio between the current flowing in the transistor Q1 and the current flowing in the transistor Q2 to a desired value by changing the size ratio between the transistors Q1 and Q2.

Figure 15:
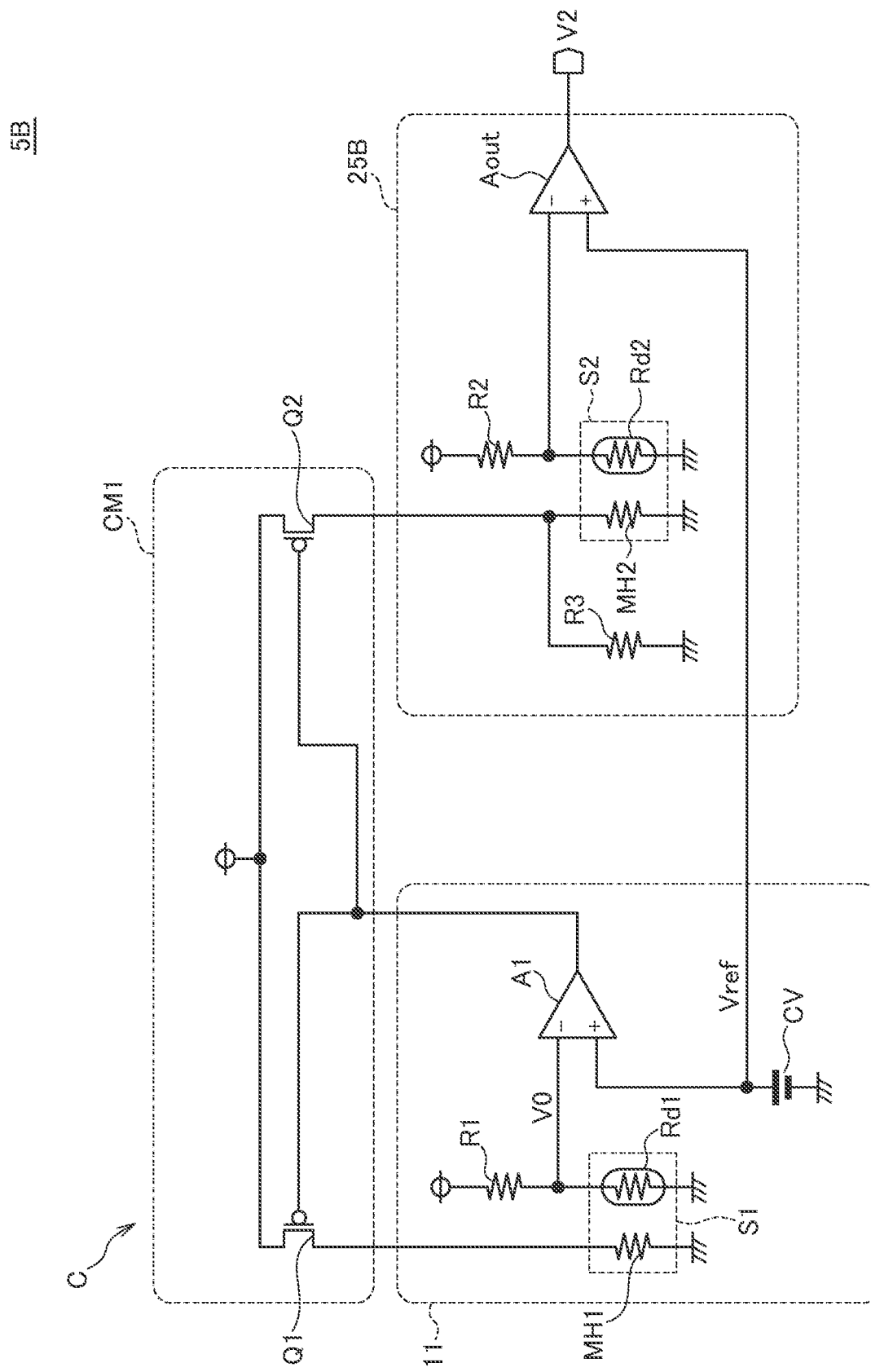
FIG. 15 is a circuit diagram of a gas sensor 5B according to a modification of the fifth embodiment.

FIG. 15 is a circuit diagram of a gas sensor 5B according to a modification of the fifth embodiment.

The gas sensor 5B according to the modification illustrated in FIG. 15 differs from the gas sensor 5A illustrated in FIG. 14 in that a shunt resistor R3 is added to a sensor circuit part 25B. Other basic configurations are the same as those of the gas sensor 5A illustrated in FIG. 14, so the same reference numerals are given to the same elements, and overlapping description will be omitted.

Like the gas sensor 3B illustrated in FIG. 11, the gas sensor 4B according to the modification illustrated in FIG. 15 has a configuration in which the shunt resistor R3 is connected in parallel to the second heater resistor MH2. Accordingly, the current flowing in the second heater resistor MH2 decreases. As a result, the first and second thermistors Rd1 and Rd2 can be heated to mutually different temperatures, and thus the gas sensor 5B is suitably applied to a heat conduction type gas sensor. Thus, even when the size ratio between the transistors Q1 and Q2 is 1:1, it is possible to set the ratio between the current flowing in the first heater resistor MH1 and the current flowing in the second heater resistor MH2 to a desired value by adding the shunt resistor R3.

Sixth Embodiment

Figure 16:
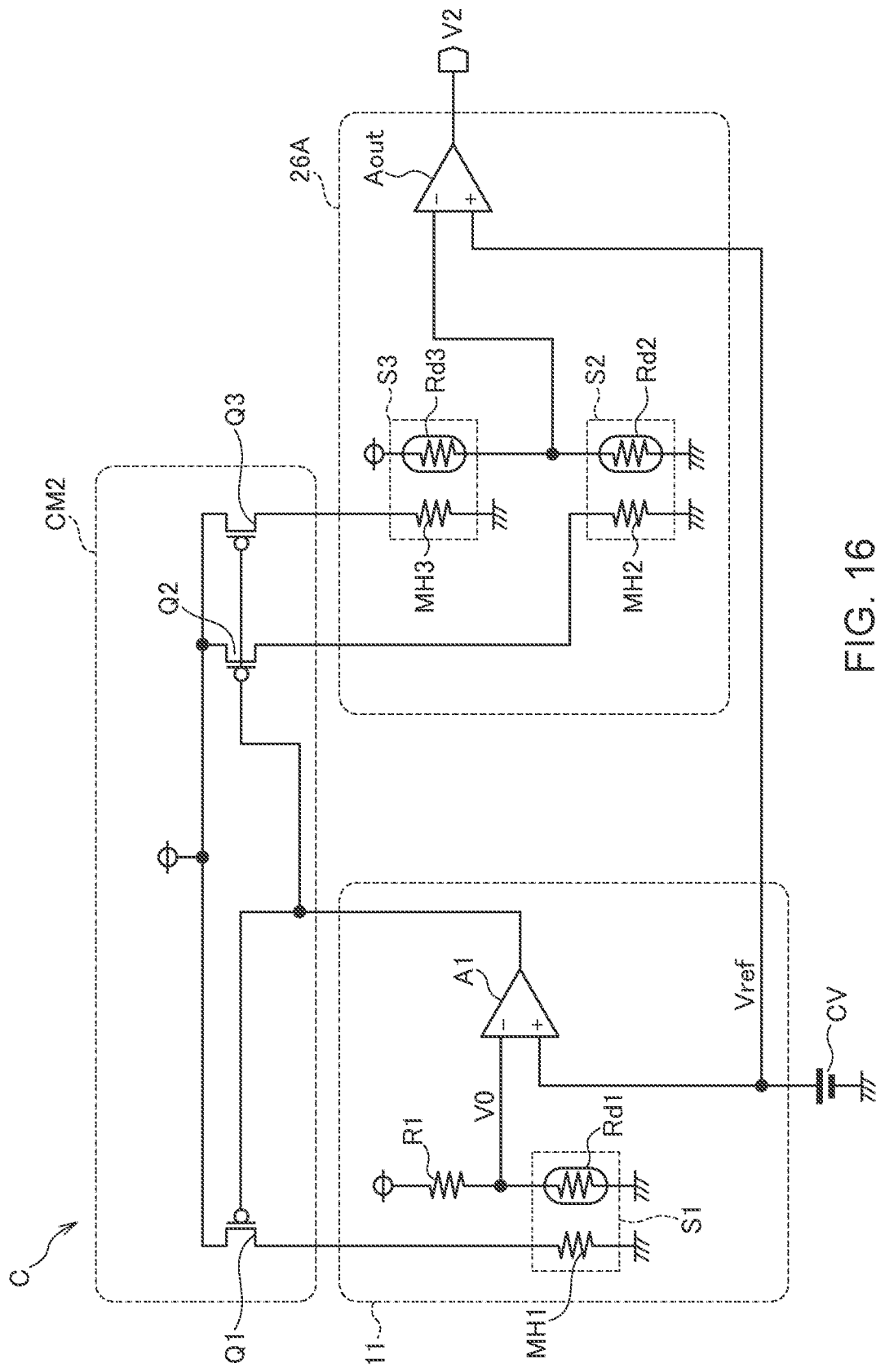
FIG. 16 is a circuit diagram of a gas sensor 6A according to a sixth embodiment of the present invention.

FIG. 16 is a circuit diagram of a gas sensor 6A according to a sixth embodiment of the present invention.

As illustrated in FIG. 16, the gas sensor 6A according to the sixth embodiment of the present invention is composed of the feedback circuit part 11, a sensor circuit part 26A, and a current mirror circuit CM2. The feedback circuit part 11 and the sensor circuit part 26A correspond respectively to the feedback circuit part 10 and the sensor circuit part 20 which are illustrated in FIG. 1, so the same reference numerals are given to the same elements, and overlapping description will be omitted. The sensor circuit part 26A has the same circuit configuration as the sensor circuit part 24A illustrated in FIG. 12.

The current mirror circuit CM2 corresponds to the current regulating circuit C and has a configuration obtained by adding a p-channel type MOS transistor Q3 to the current mirror circuit CM1 illustrated in FIG. 14. The transistor Q3 is connected in series to the third heater resistor MH3. The gate electrodes of the transistors Q1 to Q3 are supplied in common with the output of the first amplifier circuit A1. Thus, when the size ratio between the transistors Q1, Q2, and Q3 is 1:1:1, the same current flows in the transistors Q1, Q2, and Q3 with the result that the same current flows in the first to third heater resistors MH1 to MH3.

As described above, it is possible to make the same current flow in the first to third heater resistors MH1 to MH3 by using the current mirror circuit CM2. Further, it is possible to set the ratio between the current flowing in the transistor Q1, the current flowing in the transistor Q2, and the current flowing in the transistor Q3 to a desired value by changing the size ratio between the transistors Q1, Q2, and Q3.

Figure 17:
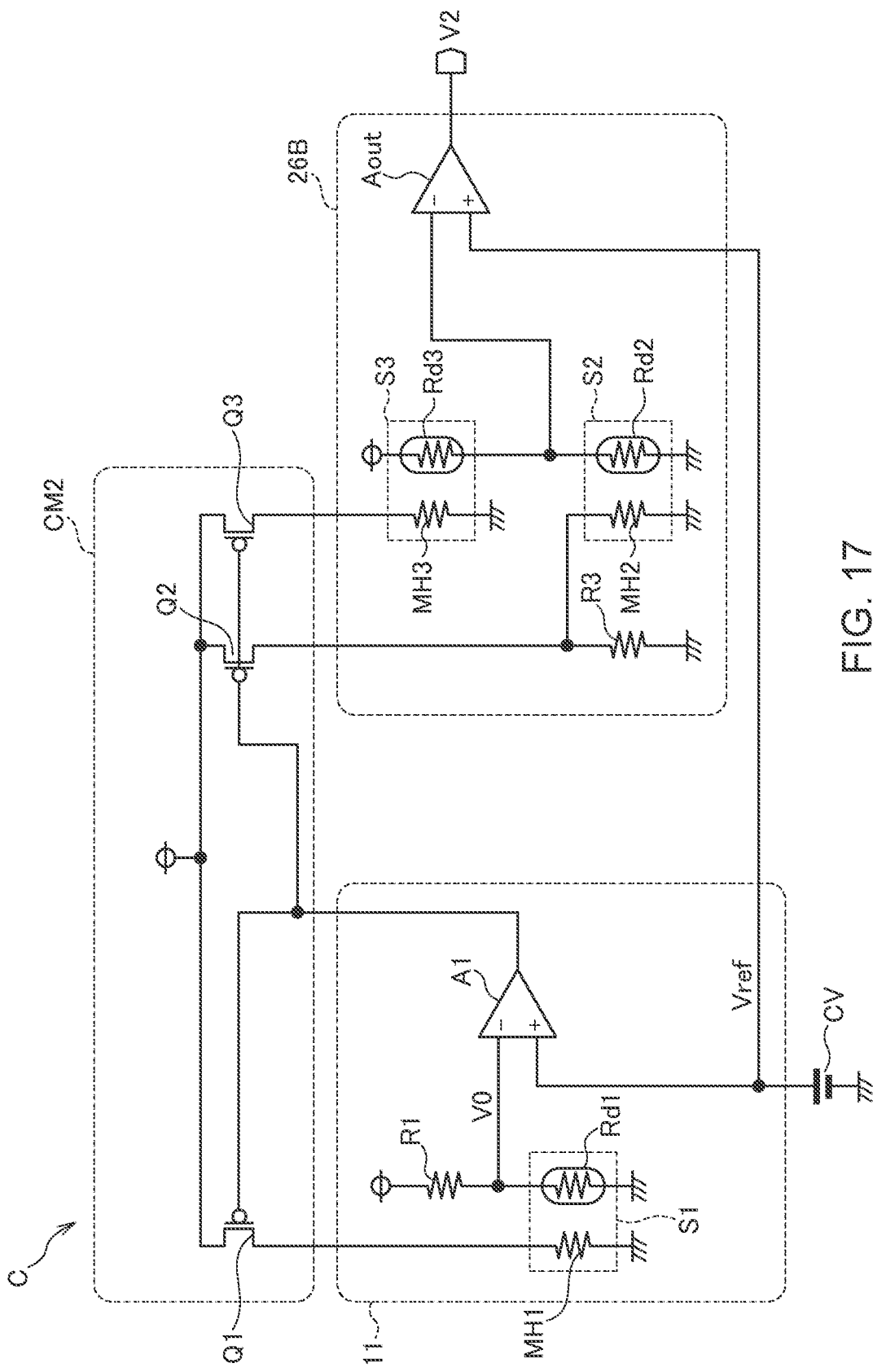
FIG. 17 is a circuit diagram of a gas sensor 6B according to a modification of the sixth embodiment.

FIG. 17 is a circuit diagram of a gas sensor 6B according to a modification of the sixth embodiment.

The gas sensor 6B according to the modification illustrated in FIG. 17 differs from the gas sensor 6A illustrated in FIG. 16 in that a shunt resistor R3 is added to a sensor circuit part 26B. Other basic configurations are the same as those of the gas sensor 6A illustrated in FIG. 16, so the same reference numerals are given to the same elements, and overlapping description will be omitted.

Like the gas sensor 3B illustrated in FIG. 11, the gas sensor 6B according to the modification illustrated in FIG. 17 has a configuration in which the shunt resistor R3 is connected in parallel to the second heater resistor MH2.

Accordingly, the current flowing in the second heater resistor MH2 decreases. As a result, the first and third thermistors Rd1 and Rd3 and the second thermistor Rd2 can be heated to mutually different temperatures, and thus the gas sensor 6B is suitably applied to a heat conduction type gas sensor. Thus, even when the size ratio between the transistors Q1, Q2, and Q3 is 1:1:1, it is possible to set the ratio between the current flowing in the first and third heater resistors MH1 and MH3 and the current flowing in the second heater resistor MH2 to a desired value by adding the shunt resistor R3.

It is apparent that the present invention is not limited to the above embodiments, but may be modified and changed without departing from the scope and spirit of the invention.

REFERENCE SIGNS LIST 1, 1A-6A, 1B-6B gas sensor
10, 11 feedback circuit part
20, 21A-26A, 21B-26B sensor circuit part
31, 41 substrate
31a, 41a cavity
32, 33, 42, 43 insulating film
34, 44 heater protective film
35, 45 thermistor electrode
36, 46 thermistor protective film
37a-37d, 47a-47d electrode pad
51 ceramic package
52 lid
53 vent hole
54 package electrode
55 bonding wire
56 external terminal
A1 first amplifier circuit
A2 second amplifier circuit
A3 third amplifier circuit
Aout output amplifier
C current regulating circuit
CM1, CM2 current mirror circuit
CV constant voltage source
MH1 first heater resistor
MH2 second heater resistor
MH3 third heater resistor
Q1-Q3 transistor
R1, R2 reference resistor
R3 shunt resistor
Rd1 first thermistor
Rd2 second thermistor
Rd3 third thermistor
S1 first sensor element
S2 second sensor element
S3 third sensor element
TD1 first temperature sensing element
TD2 second temperature sensing element

What is claimed is:

1. A gas sensor comprising:
a feedback circuit part including a reference resistor and a first temperature sensing element which are connected in series, a first heater resistor that heats the first temperature sensing element, and a first amplifier circuit that controls an amount of current to flow in the first heater resistor based on a potential at a connection point between the reference resistance and the first temperature sensing element; and
a sensor circuit part including a second temperature sensing element whose resistance value changes according to a concentration of a gas to be measured and a second heater resistor that heats the second temperature sensing element,
wherein a current according to an output of the first amplifier circuit flows in the second heater resistor.

2. The gas sensor as claimed in claim 1, wherein the sensor circuit part further includes a second amplifier circuit that controls an amount of current to flow in the second heater resistor according to an output voltage of the first amplifier circuit.

3. The gas sensor as claimed in claim 2, wherein the amount of current flowing in the first heater resistor and the amount of current flowing in the second heater resistor differ from each other.

4. The gas sensor as claimed in claim 2, wherein the sensor circuit part further includes a third temperature sensing element connected in series to the second temperature sensing element, a third heater resistor that heats the third temperature sensing element, and a third amplifier circuit that controls an amount current to flow in the third heater resistor according to the output voltage of the first amplifier circuit.

5. The gas sensor as claimed in claim 4, wherein the amount of current flowing in the second heater resistor and the amount of current flowing in the third heater resistor differ from each other.

6. The gas sensor as claimed in claim 1, wherein the first and second heater resistors are connected in series.

7. The gas sensor as claimed in claim 6,
wherein the sensor circuit part further includes a third temperature sensing element connected in series to the second temperature sensing element and a third heater resistor that heats the third temperature sensing element, and
wherein the first, second, and third heater resistors are connected in series.

8. The gas sensor as claimed in claim 1, further comprising a current mirror circuit that makes current flow in the first and second heater resistors at a predetermined ratio.

9. The gas sensor as claimed in claim 8,
wherein the sensor circuit part further includes a third temperature sensing element connected in series to the second temperature sensing element and a third heater resistor that heats the third temperature sensing element, and
wherein the current mirror circuit makes current flow in the first, second, and third heater resistors at a predetermined ratio.

10. The gas sensor as claimed in claim 1, wherein the sensor circuit part further includes a shunt resistor connected in parallel to the second heater resistor.

11. The gas sensor as claimed in claim 1,
wherein the sensor circuit part further includes an output amplifier that generates an output signal by comparing a potential at one end of the second temperature sensing element and a reference potential, and
wherein the first amplifier circuit controls the amount of current to flow in the first heater resistor by comparing a potential at the connection point and reference potential.

12. The gas sensor as claimed in claim 1, wherein a first sensor element including the first temperature sensing element and first heater resistor and a second sensor element including the second temperature sensing element and second heater resistor are housed in a same package.

13. The gas sensor as claimed in claim 1, wherein a first sensor element including the first temperature sensing element and first heater resistor and a second sensor element including the second temperature sensing element and second heater resistor are integrated on a same substrate.

14. The gas sensor as claimed in claim 1, wherein the temperature sensing element is a thermistor.

15. The gas sensor as claimed in claim 3, wherein the sensor circuit part further includes a third temperature sensing element connected in series to the second temperature sensing element, a third heater resistor that heats the third temperature sensing element, and a third amplifier circuit that controls an amount current to flow in the third heater resistor according to the output voltage of the first amplifier circuit.

* * * * *